(12) United States Patent
Tokunaga

(10) Patent No.: US 7,831,909 B2
(45) Date of Patent: Nov. 9, 2010

(54) INFORMATION PROCESSING APPARATUS, CONTROL METHOD THEREFOR, AND PROGRAM WITH DISPLAY BASED ON CHANGE AMOUNT OF FIELD AREAS

(75) Inventor: Momoe Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1156 days.

(21) Appl. No.: 11/336,981

(22) Filed: Jan. 23, 2006

(65) Prior Publication Data
US 2006/0168514 A1 Jul. 27, 2006

(30) Foreign Application Priority Data
Jan. 27, 2005 (JP) .............................. 2005-020020

(51) Int. Cl.
*G06F 17/00* (2006.01)
(52) U.S. Cl. .................. 715/247; 715/274; 715/277
(58) Field of Classification Search ............... 715/225, 715/247, 253, 274, 277
See application file for complete search history.

(56) References Cited

U.S. PATENT DOCUMENTS

| | | | |
|---|---|---|---|
| 5,845,303 A | 12/1998 | Templeman | |
| 6,826,727 B1 * | 11/2004 | Mohr et al. .................. 715/235 |
| 2003/0023627 A1 * | 1/2003 | Kerr ........................... 707/507 |
| 2005/0094205 A1 * | 5/2005 | Lo et al. ..................... 358/1.18 |
| 2005/0094207 A1 * | 5/2005 | Lo et al. ..................... 358/1.18 |
| 2006/0103667 A1 * | 5/2006 | Amit et al. .................. 345/619 |
| 2006/0139461 A1 | 6/2006 | Matsui et al. |
| 2006/0161836 A1 * | 7/2006 | Thomson et al. ............ 715/505 |
| 2007/0022003 A1 * | 1/2007 | Chao et al. .................... 705/14 |

FOREIGN PATENT DOCUMENTS

| | | |
|---|---|---|
| JP | 2000-222493 | 8/2000 |
| JP | 2004-236170 | 8/2004 |
| JP | 2006-171942 | 6/2006 |

\* cited by examiner

*Primary Examiner*—Stephen S Hong
*Assistant Examiner*—Tyler J Schallhorn
(74) *Attorney, Agent, or Firm*—Fitzpatrick, Cella, Harper & Scinto

(57) ABSTRACT

A document is displayed which is formed from a page in which field areas containing data of a plurality of types of records are laid out on the basis of the template. The sizes of the field areas in the template are calculated on the basis of the amounts or sizes of data of the data fields for each record, and the layout of the calculated field areas in the template is determined. The change amount of the field area after the layout is determined is calculated. On the basis of the calculated change amount, the order of records which form a document to be displayed is changed to display the records.

9 Claims, 26 Drawing Sheets

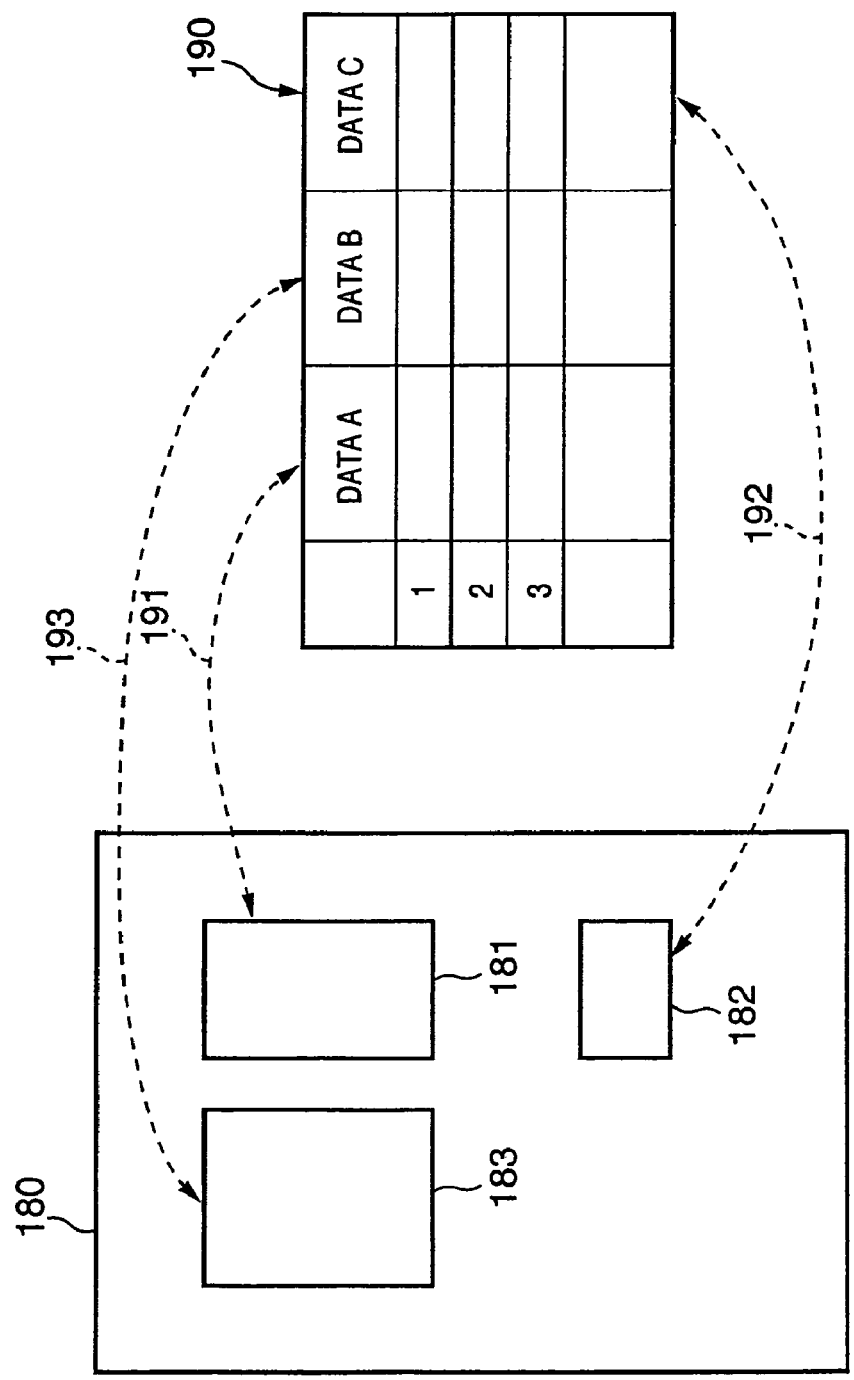

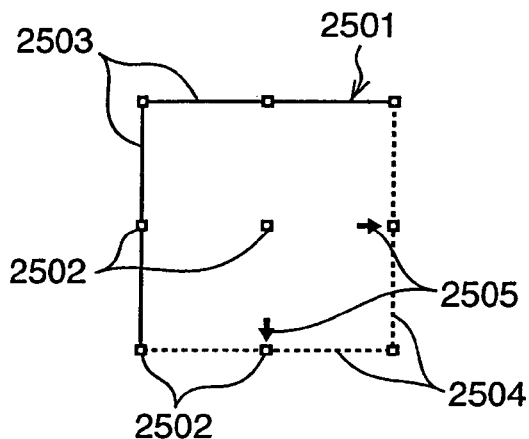
F I G. 5A
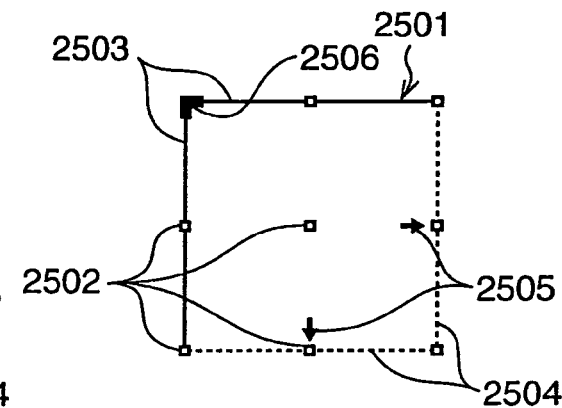
F I G. 5B
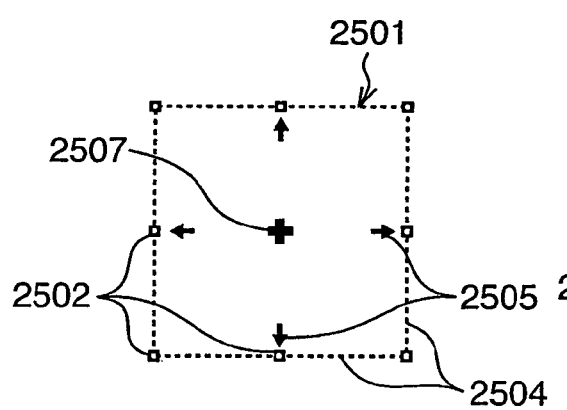
F I G. 5C
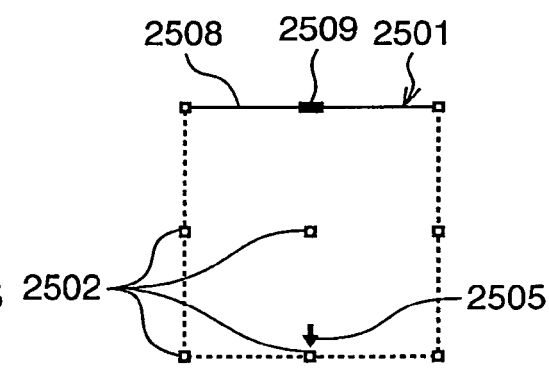
F I G. 5D

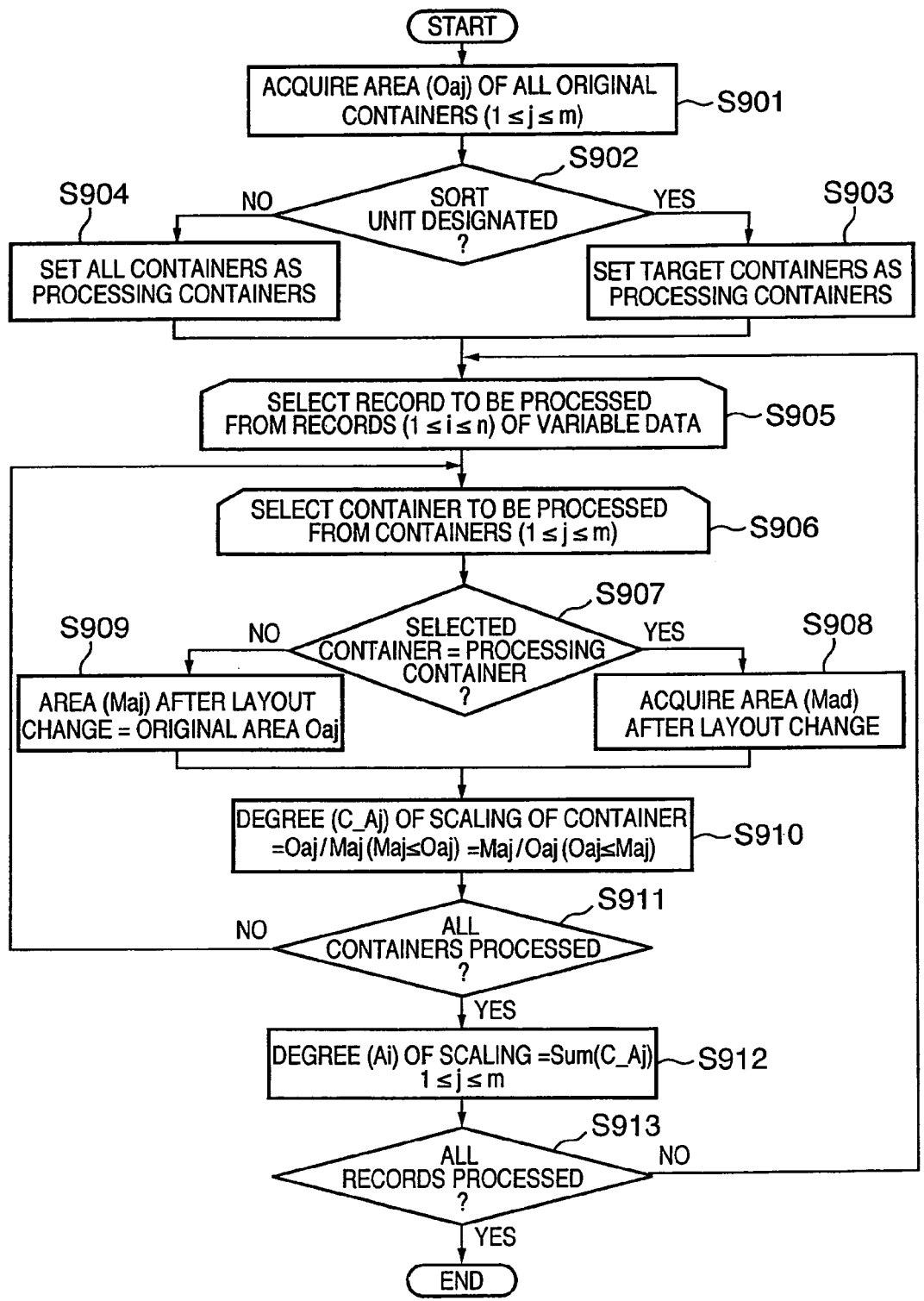
F I G. 16

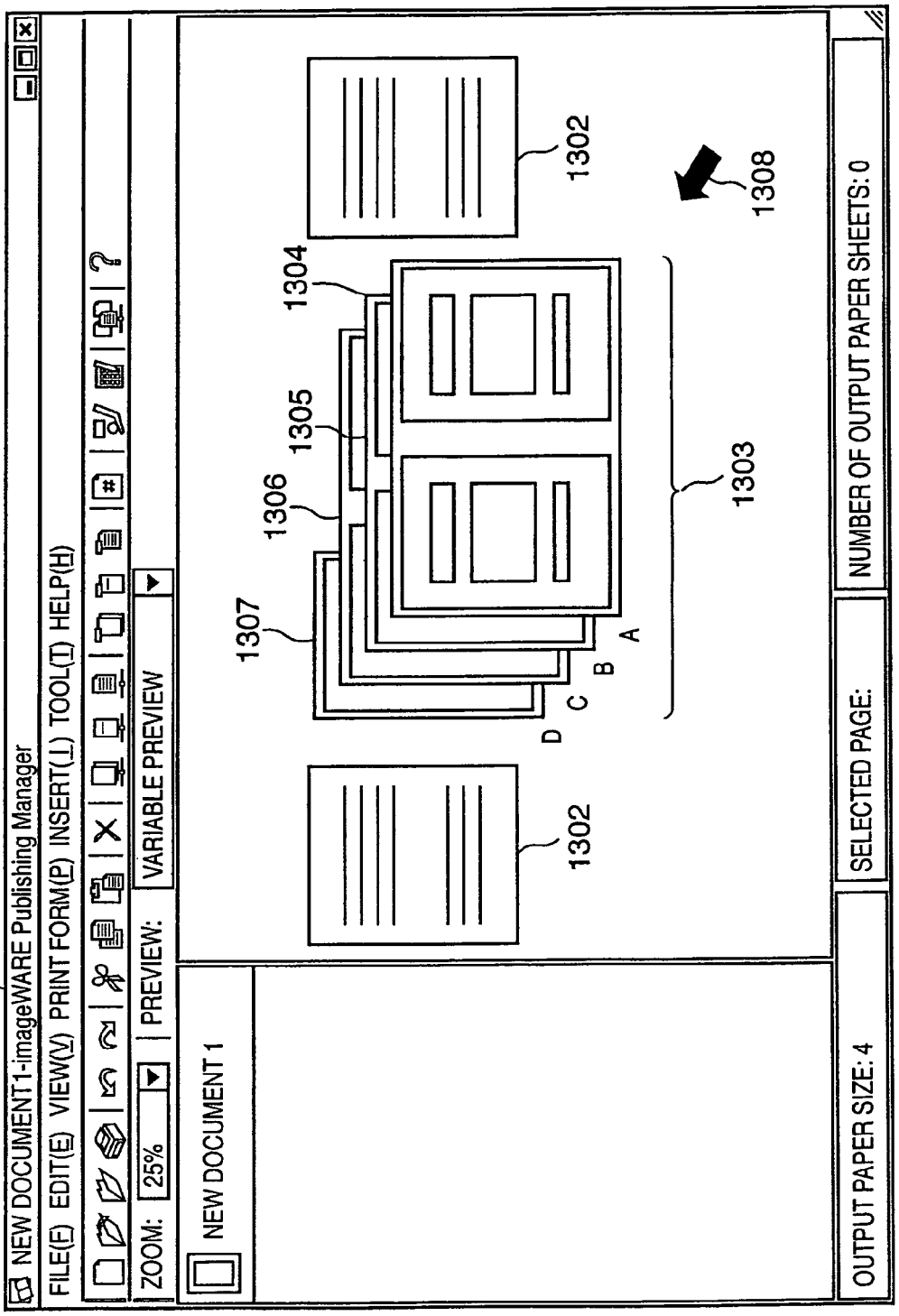

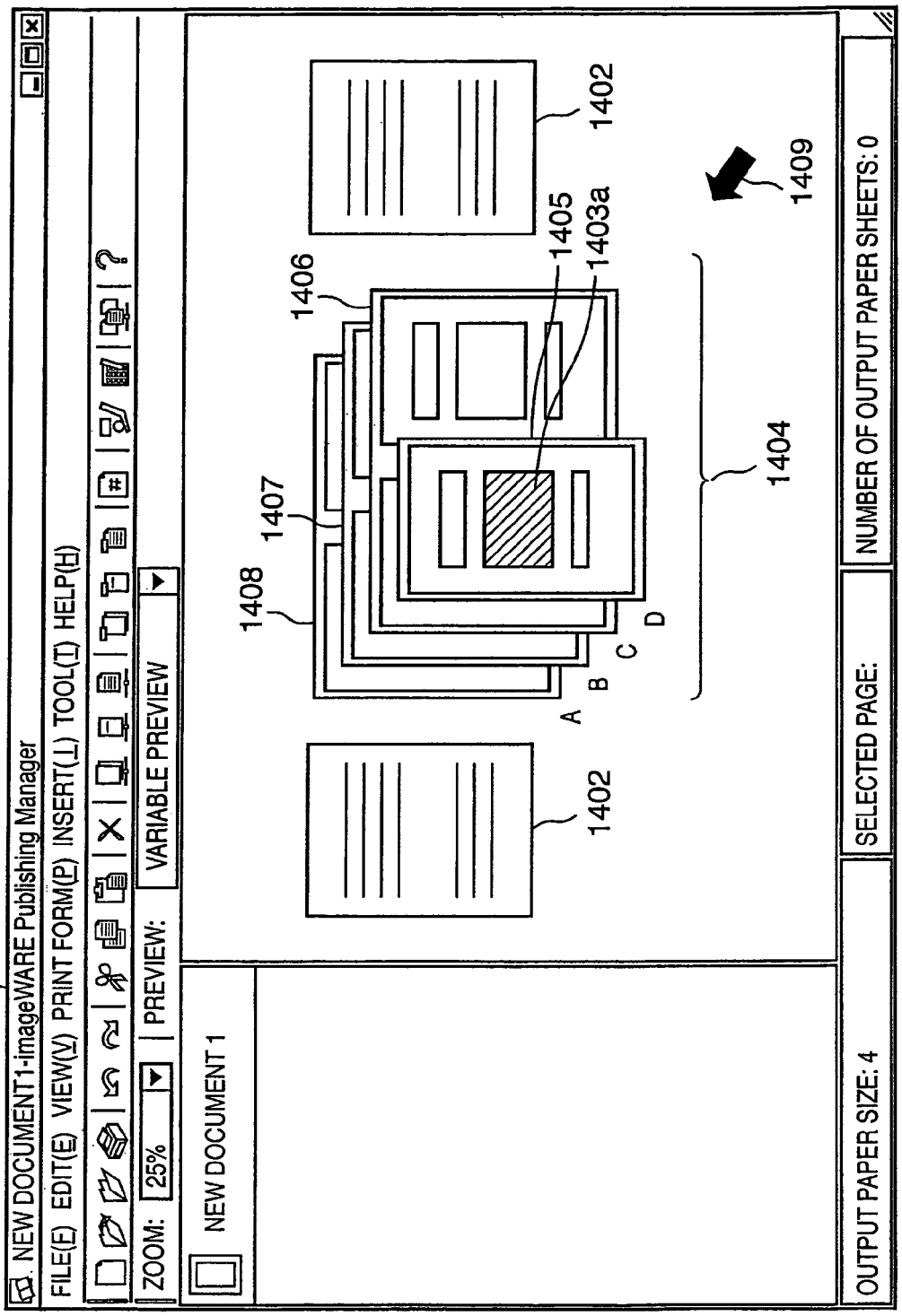

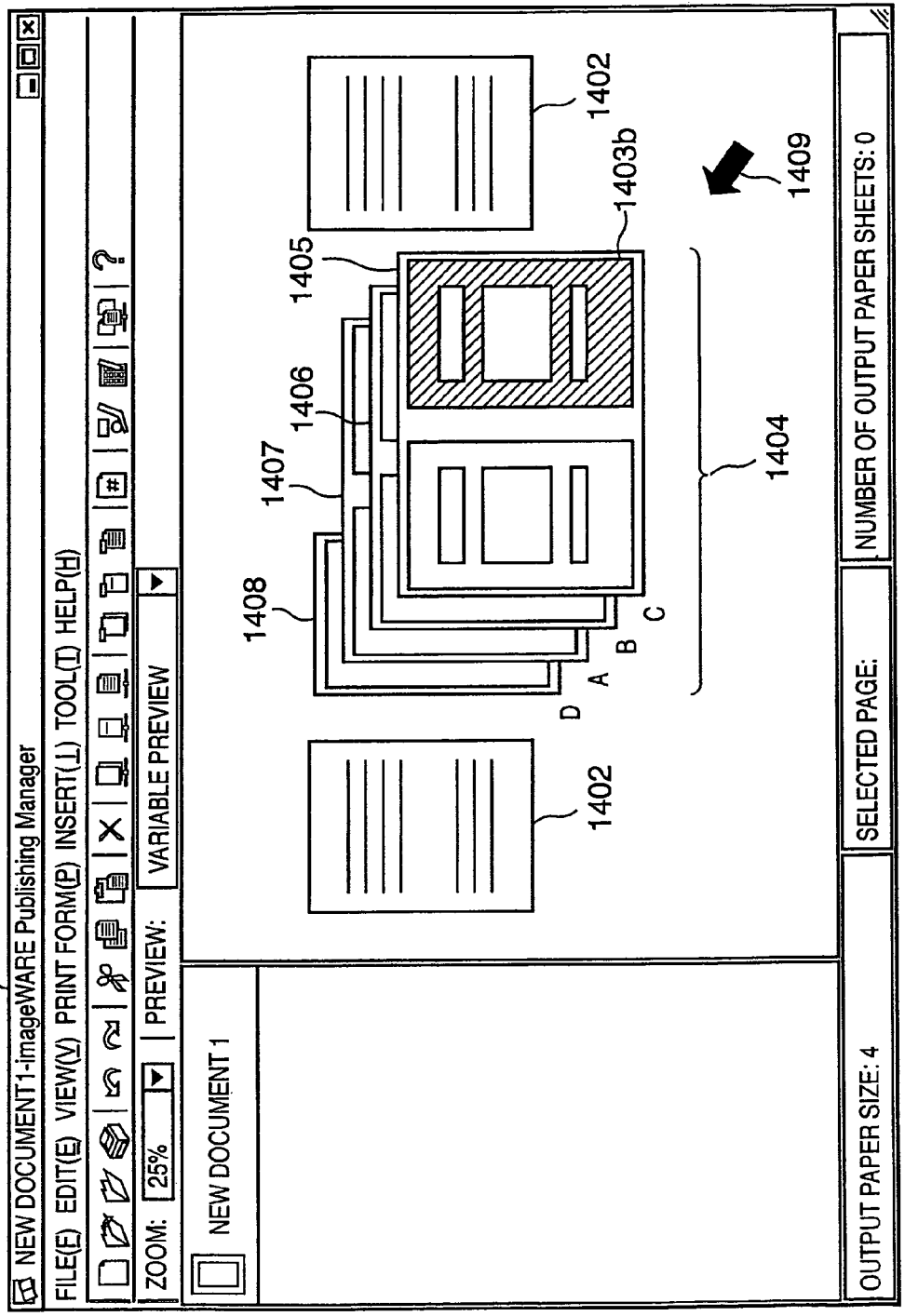

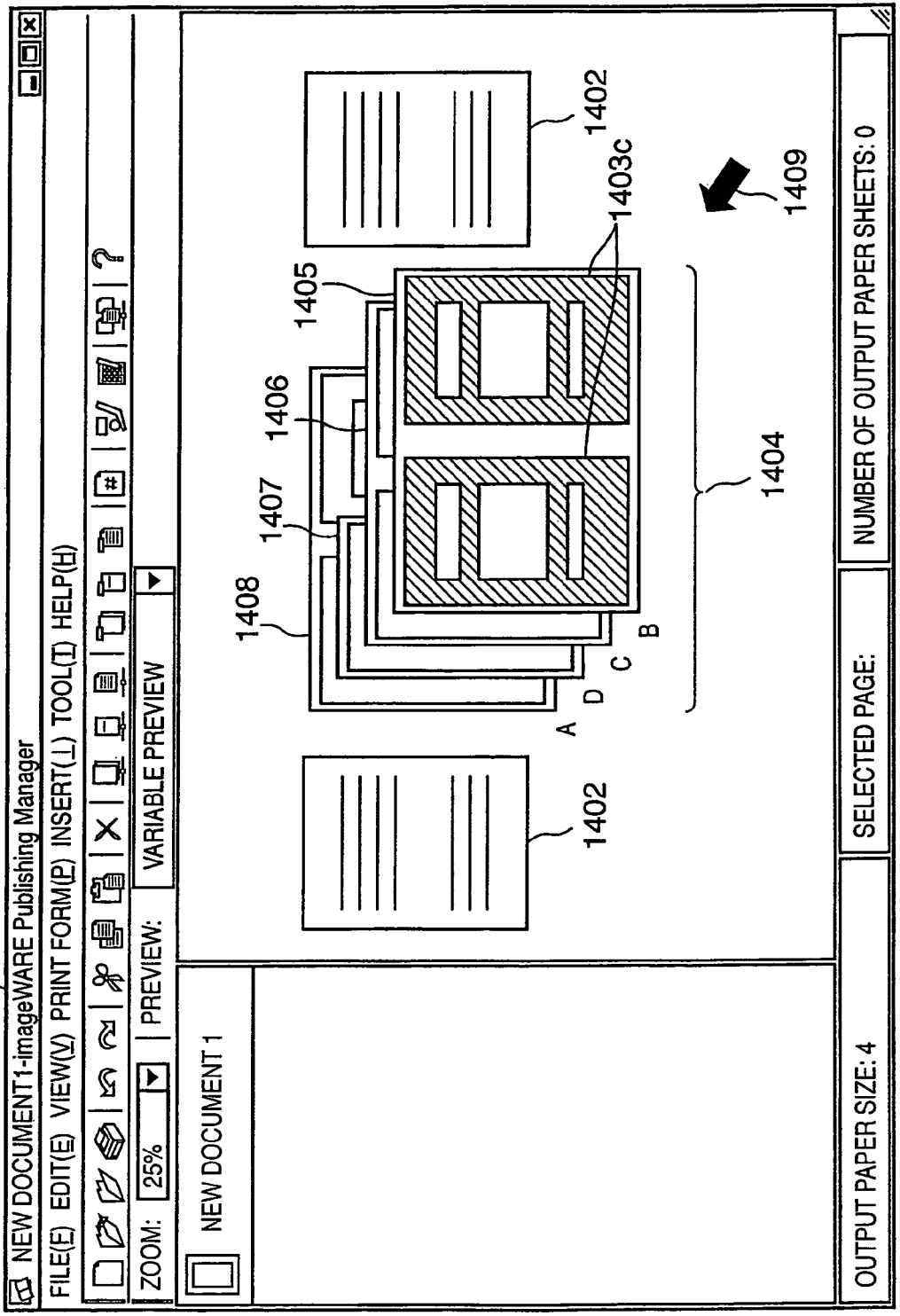

INFORMATION PROCESSING APPARATUS, CONTROL METHOD THEREFOR, AND PROGRAM WITH DISPLAY BASED ON CHANGE AMOUNT OF FIELD AREAS

FIELD OF THE INVENTION

The present invention relates to an information processing apparatus which creates a document by laying out, in a page on the basis of a template, field areas for inserting data of data fields from a record made up of a plurality of types of data fields, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise the customer satisfaction, win new customers, and keep customers.

One-to-one marketing is a kind of database marketing which creates a database of individual attribute information including the age, gender, hobby, preference, and purchase log of a customer, analyzes the contents of the database, and makes a proposal complying with customer's needs. A typical method of this marketing is variable printing. These days, a variable printing system which customizes document contents for each customer and outputs the document has been developed along with the development of the DTP (Desk Top Publishing) technique and the pervasion of digital printing apparatuses. For example, the template of a customized document for variable printing can be created by a form creation application as disclosed in Japanese Patent Laid-Open No. 2000-222493.

Generally, when such a customized document is to be created by the variable printing system, containers are laid out in a document. The container is a drawing area for drawing contents (drawing contents (e.g., an image and text)), and is also called a field area.

In a conventional variable printing system, the size of a container associated with a text or image serving as contents is fixed. When contents in the database are inserted (flowed) into a container and the data amount is larger than the container size, the following problems arise. That is, if the data is a text, overlapping of the text occurs. If the data is an image, clipping of the image by the container occurs. When the data amount is smaller than the container size, no proper display may be obtained such that a gap appears between the container and its internal contents.

In order to solve these problems, there is proposed an automatic layout system. The automatic layout system can flexibly set the container size of a container laid out in a document. Software which implements the automatic layout system can change the container size in accordance with, e.g., the data amount to be inserted.

A desired customized document can be created by, for example, laying out such containers in a document and associating a database with the layout (associating various contents in the database with the containers). The contents of the document can be changed (made variable) by properly switching contents in a container in the customized document (changing the association). Such a document is called a variable data document, and a printing system using a variable data document is a variable printing system.

There is also proposed a technique of, when a text to be inserted into a container of a fixed container size exceeds the container size, changing (in this case, reducing) the font size of the text and displaying all the text within the container.

In an environment where the container size is flexible, when a container becomes large depending on contents to be inserted, the container overlaps another container in the same document. In an environment where the font size is flexible, the font size becomes excessively small when the data amount of text to be inserted is very large.

The system which automatically calculates the position and size of each container in accordance with the amount and size of contents is effective for preventing overflow of contents and reducing the free space area. However, a layout not intended by the creator may be determined, and it is difficult to completely automatically determine the layout.

Hence, the final layout of a document whose layout dynamically changes in accordance with contents such as a text or image must be confirmed before printing. When each record targets a document made up of a plurality of pages, and the document contains both a page of a dynamically changed layout and a page of a fixed layout, it is expected that the document is finally confirmed mainly about a page whose layout has dynamically been changed.

However, variable printing generally prints many records (e.g., 10,000 records). If the number of records of variable data which form a document is very large, it is very difficult to manually find out a page whose layout has dynamically been changed or a record of a large layout change amount from an original template.

SUMMARY OF THE INVENTION

The present invention has been made to overcome the conventional drawbacks, and has as its object to provide an information processing apparatus capable of easily, effectively presenting a layout-changed portion in a document in accordance with the application purpose, a control method therefor, and a program.

According to the present invention, the foregoing object is attained by providing an information processing apparatus which creates a document by laying out, in a page on the basis of a template, field areas for inserting data of data fields from a record made up of a plurality of types of data fields, comprising:

display means for displaying a document formed from a page in which the field areas containing data of a plurality of types of records are laid out on the basis of the template;

layout determination means for calculating sizes of the field areas in the template on the basis of amounts or sizes of data of the data fields for each record, and determining a layout of the calculated field areas in the template;

calculation means for calculating a change amount of the field area after the layout is determined by the layout determination means; and display control means for changing, on the basis of the change amount calculated by the calculation means, an order of the records which form the document to be displayed by the display means, and displaying the records.

In a preferred embodiment, the layout determination means calculates ideal values of the sizes of the field areas serving as merge destinations from the amounts or the sizes of data of the data fields, and when the field areas in the template cannot be laid out to satisfy the ideal values of the field areas, determines sizes and positions of the field areas so as to make equal loads based on differences from the ideal values.

In a preferred embodiment, as a display method of changing the order of the records which form the document displayed by the display means, and displaying the records, one of a first display method of displaying, in a record order, the records which form the document, and a second display method of displaying, in a change amount order, the records which form the document can be designated, and the second display method can designate one of a plurality of types of change amounts as the change amount.

In a preferred embodiment, the change amount includes at least a change amount of an aspect ratio of the field area before and after the layout is determined by the layout determination means, a moving amount of a container from an arbitrary start point before and after the layout is determined by the layout determination means, and a change amount of an area of the container before and after the layout is determined by the layout determination means.

In a preferred embodiment, the second display method can further designate an arbitrary number of records to be displayed among the records which form the document.

In a preferred embodiment, when the document is edited after the document is displayed by the display control means, the display control means changes again, on the basis of an editing content, the order of the records which form the document, and displays the records.

In a preferred embodiment, the display means displays a confirmation window for confirming whether to change again the order of the records which form the document.

According to the present invention, the foregoing object is attained by providing a method of controlling an information processing apparatus which creates a document by laying out, in a page on the basis of a template, field areas for inserting data of data fields from a record made up of a plurality of types of data fields, comprising:

a display step of displaying, on a display unit, a document formed from a page in which the field areas containing data of a plurality of types of records are laid out on the basis of the template;

a layout determination step of calculating sizes of the field areas in the template on the basis of amounts or sizes of data of the data field for each record, and determining a layout of the calculated field areas in the template;

a calculation step of calculating a change amount of the field area before and after the layout is determined in the layout determination step; and a display control step of changing, on the basis of the change amount calculated in the calculation step, an order of the records which form the document to be displayed on the display unit, and displaying the records.

According to the present invention, the foregoing object is attained by providing a program for causing a computer to control an information processing apparatus which creates a document by laying out, in a page on the basis of a template, field areas for inserting data of data fields from a record made up of a plurality of types of data fields, characterized by causing the computer to execute a display step of displaying, on a display unit, a document formed from a page in which the field areas containing data of a plurality of types of records are laid out on the basis of the template, a layout determination step of calculating sizes of the field areas in the template on the basis of amounts or sizes of data of the data fields for each record, and determining a layout of the calculated field areas in the template, a calculation step of calculating a change amount of the field area before and after the layout is determined in the layout determination step, and a display control step of changing, on the basis of the change amount calculated in the calculation step, an order of the records which form the document to be displayed on the display unit, and displaying the records.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining an outline of variable data printing according to the embodiment of the present invention;

FIG. 5A is a view for explaining container display rules according to the embodiment of the present invention;

FIG. 5B is a view for explaining the container display rules according to the embodiment of the present invention;

FIG. 5C is a view for explaining the container display rules according to the embodiment of the present invention;

FIG. 5D is a view for explaining the container display rules according to the embodiment of the present invention;

FIG. 16 is a flowchart showing details of a degree-of-scaling calculation process according to the embodiment of the present invention;

FIG. 20 is a view showing the state of a default variable data preview according to the embodiment of the present invention;

FIG. 21A is a view showing the state of a variable data preview (container unit) on the basis of the change amount according to the embodiment of the present invention;

FIG. 21B is a view showing the state of a variable data preview (page unit) on the basis of the change amount according to the embodiment of the present invention; and FIG. 21C is a view showing the state of a variable data preview (record unit) on the basis of the change amount according to the embodiment of the present invention.

DETAILED DESCRIPTION OF THE PREFERRED EMBODIMENTS

A preferred embodiment of the present invention will be described in detail in accordance with the accompanying drawings.

<System Configuration>

The hardware configuration of an information processing system and that of a host computer as a building component of the information processing system according to the embodiment will be described with reference to FIGS. 1A and 1B.

Figure 1A:
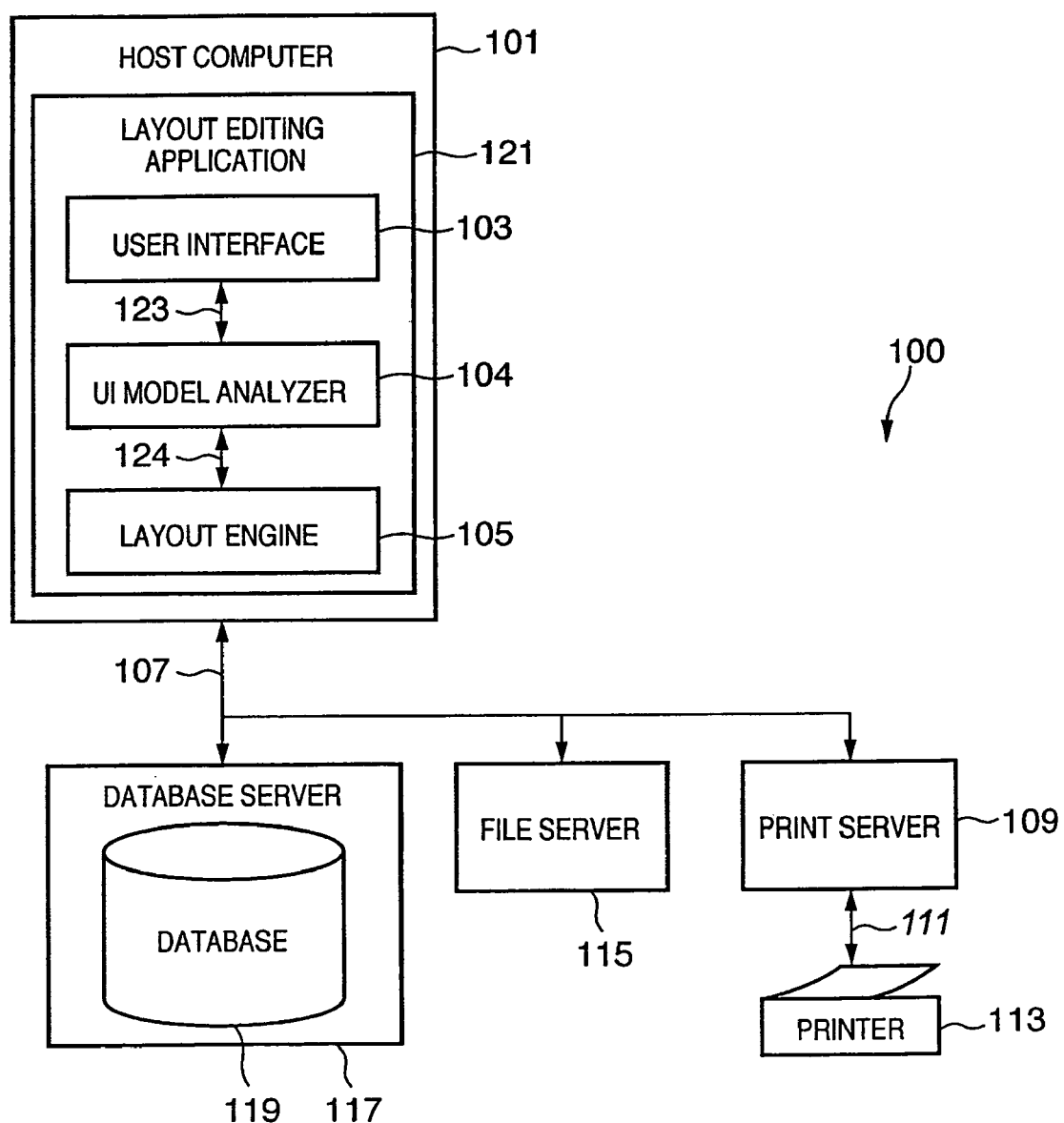
FIG. 1A is a block diagram showing an example of the configuration of an information processing system according to an embodiment of the present invention.

FIG. 1A is a block diagram showing an example of the configuration of the information processing system according to the embodiment of the present invention. FIG. 1B is a block diagram showing the hardware configuration of the host computer as a building component of the information processing system according to the embodiment of the present invention.

Figure 1B:
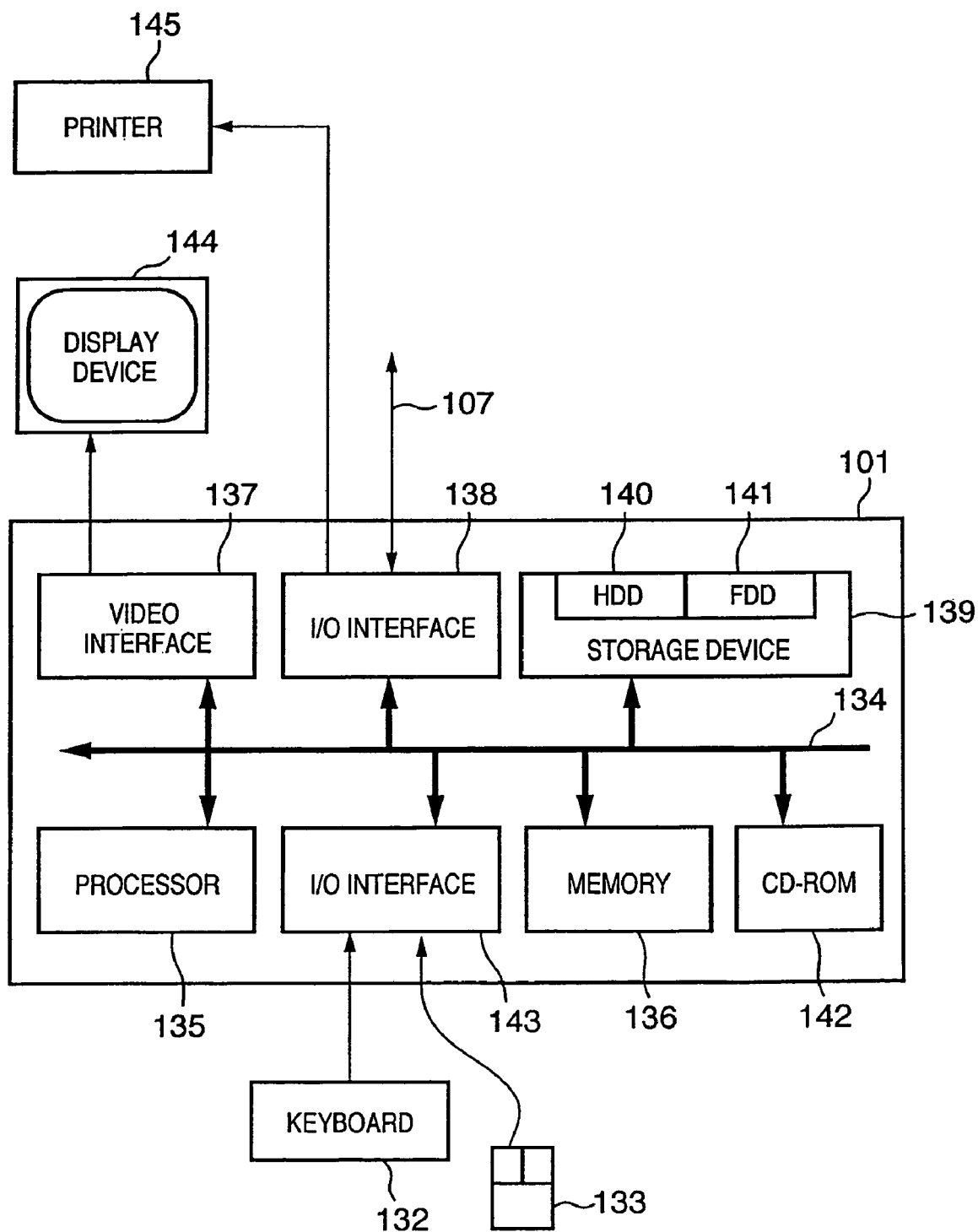
FIG. 1B is a block diagram showing the hardware configuration of a host computer as a building component of the information processing system according to the embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101 serving as the information processing apparatus of the present invention, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the embodiment is implemented by the host computer 101 (formed from a general-purpose computer module) which functions as a layout editing apparatus.

A layout editing application 121 which can run in the variable printing system 100 is executed completely or partially by the host computer 101. In particular a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a Floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), SPARCstation®, and a computer system including them.

<Outline of Layout Editing Application>

In the embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or Floppy®disk. This program is loaded into the host computer 101 via the corresponding CD-ROM drive 142 or Floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, or a magneto-optical disk. These software programs may also be loaded into the host computer 101 by radio communication (e.g., infrared communication) between the host computer 101 and another device, or from a computer-readable card (e.g., a PCMCIA card). These software programs may also be loaded into the host computer 101 from another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)), and includes three software components: a user interface 103, UI model analyzer 104, and layout engine 105.

The layout engine 105 is a software component for loading records one by one from variable data which are stored as records in the database 119, under constraints in size and position on a container (rectangular range) serving as a drawing area (partial area). Further, the layout engine 105 calculates, from the loaded variable data and the container constraints, the layout including the size and position of a container to which the loaded variable data is flowed.

The layout engine 105 also performs a process of drawing content data (variable data) as contents assigned to a container and generating an image of a variable data document. However, the present invention is not limited to this, and the layout engine 105 operates as an application which determines the size and position of each partial area (container) and outputs drawing information to a printer driver (not shown). The printer driver may perform a variable data document image drawing process and generate print data.

The user interface 103 allows the user to set the layout and attribute of a container and create a document template. The user interface 103 provides a mechanism of associating each container in the document template with a data source (variable data (contents) in the database 119).

The UI model analyzer 104 converts a container or user interface element (e.g., an anchor, slider, or link) provided by the user interface 103 into an internal format which can be recognized by the layout engine 105. In other words, the UI model analyzer 104 can easily replace the user interface 103 with a user interface of another display/input format without changing the layout engine 105.

The user interface 103 and UI model analyzer 104 communicate with each other via a communication channel 123. The UI model analyzer 104 and layout engine 105 communicate with each other via a communication channel 124.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data (content data) serving as contents to be flowed into a container. The variable data document is saved in the local file system of the host computer 101 or the file server 115, or printed directly by the printer 113 via the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
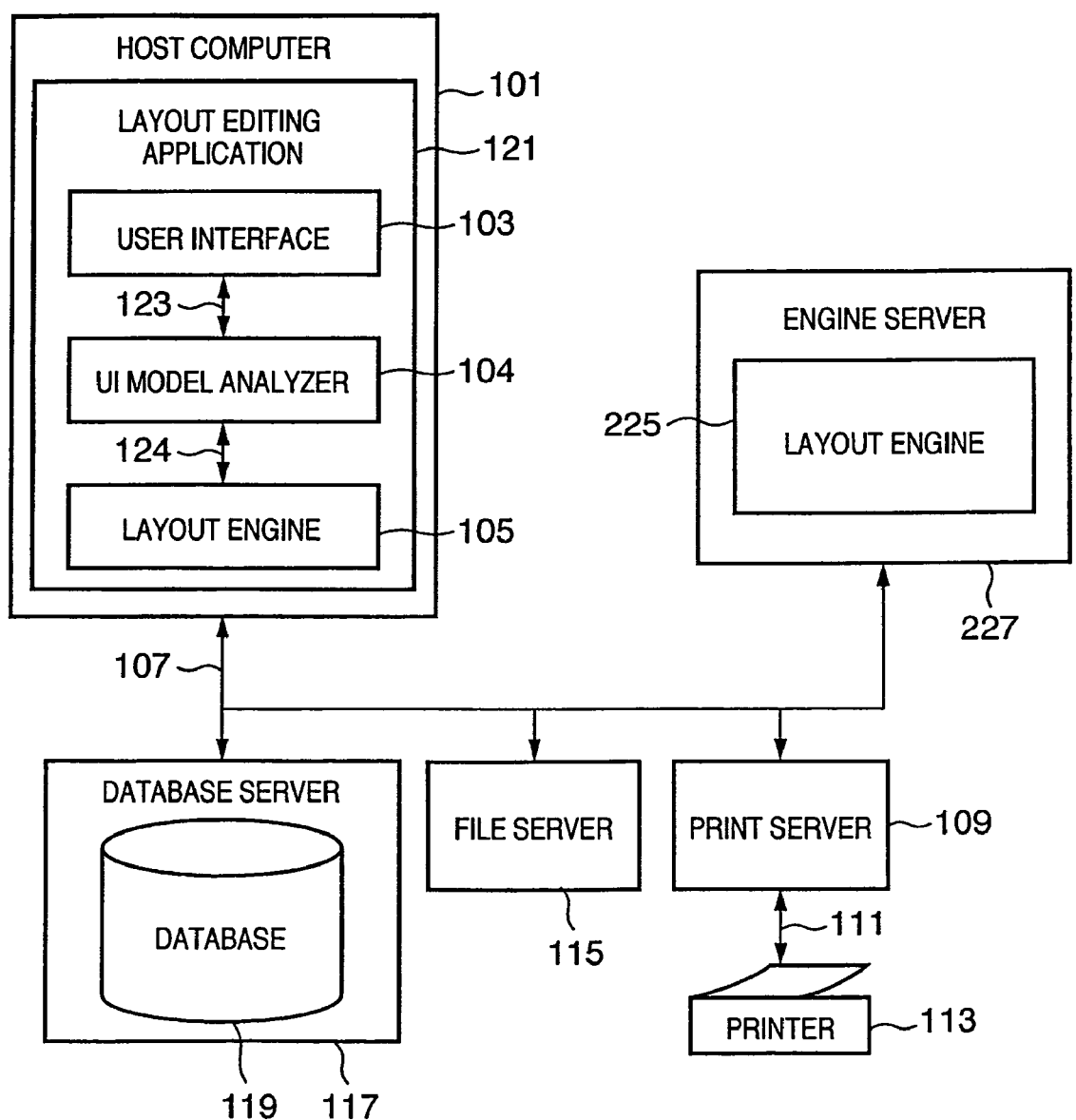
FIG. 1C is a block diagram showing another example of the configuration of the information processing system according to the embodiment of the present invention.

FIG. 1C is a block diagram showing another configuration of the information processing system according to the embodiment of the present invention.

FIG. 1C illustrates an example in which an engine server 227 is added to the network 107 and a layout engine 225 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be combined with data saved in the database 119 in order to generate a document by the layout engine 225 for printing or another purpose. Such operation is requested via the user interface 103 or so requested as to print only a specific record.

The functional configuration of the host computer will be explained with reference to FIG. 1D.

Figure 1D:
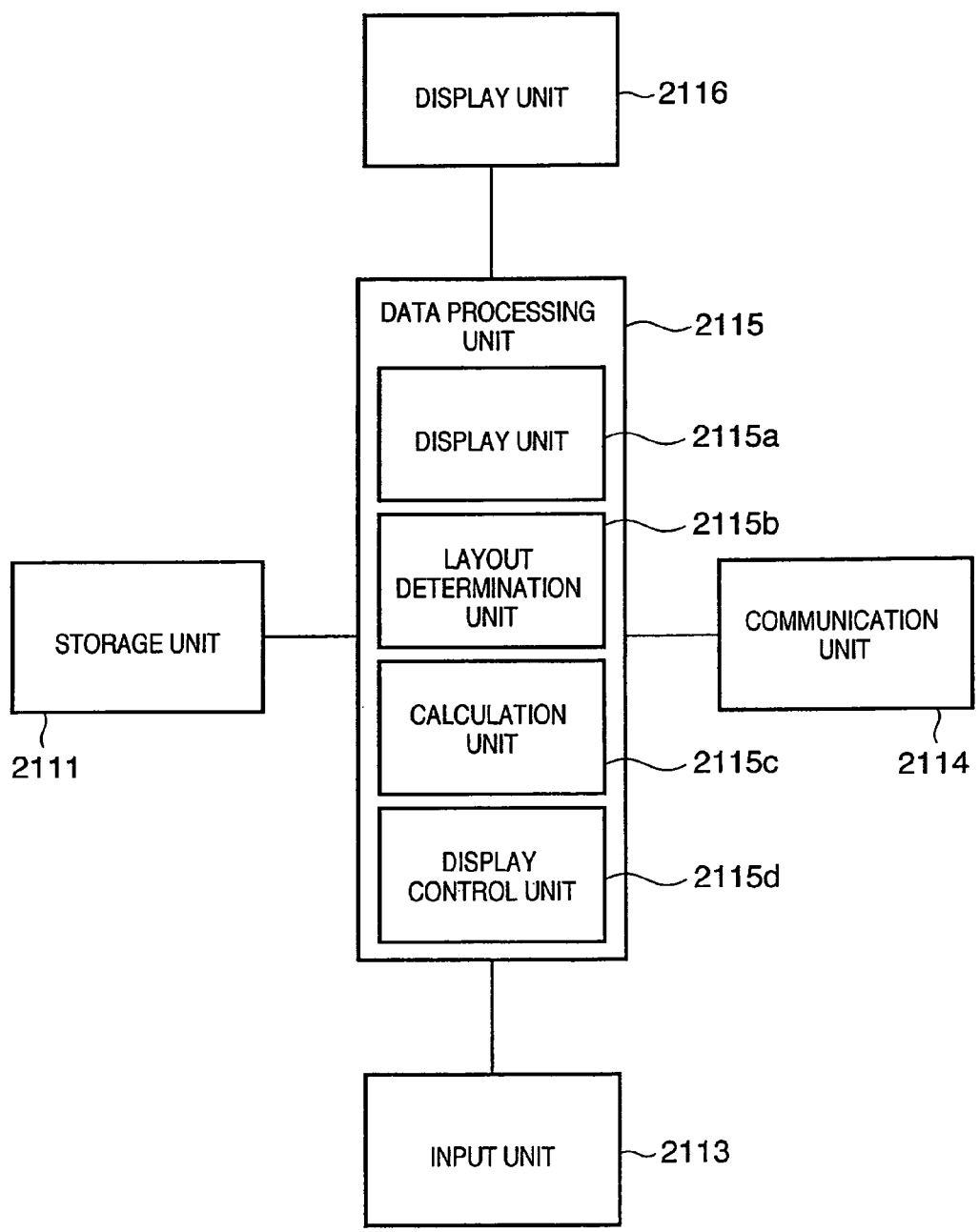
FIG. 1D is a block diagram showing the functional configuration of the host computer as a building component of the information processing system according to the embodiment of the present invention.

FIG. 1D is a block diagram showing the functional configuration of the host computer according to the embodiment of the present invention.

A data processing unit 2115 controls a storage unit 2111, display unit 2116, and input unit 2113, and executes various processes (e.g., processes represented by the flowcharts of FIGS. 8, 9, and 13 to 16) realized by various programs such as the layout editing application 121.

The data processing unit 2115 has a function of creating a document by laying out, in a page on the basis of the template, field areas for inserting data of data fields from a record made up of a plurality of types of data fields. Building components which implement this function are at least a display unit 2115*a*, layout determination unit 2115*b*, calculation unit 2115*c*, and display control unit 2115*d*.

The display unit 2115*a* displays a document formed from a page in which field areas containing data of each of a plurality of types of records are laid out on the basis of the template.

The layout determination unit 2115*b* calculates the sizes of field areas in the template on the basis of the amounts or sizes of data of data fields of each record, and determines the layout of the calculated field areas in the template.

The calculation unit 2115*c* calculates the change amount of a field area before and after the layout is determined.

On the basis of the calculated change amount, the display control unit 2115*d* changes the order of records which form a document to be displayed, and displays the records.

FIG. 1D merely illustrates a configuration corresponding to constituent features defined by independent claim 1, and a configuration corresponding to the internal configuration of the data processing unit is also implemented for dependent claims of claim 1.

A communication unit 2114 is implemented by the I/O interface 138, and exchanges data via the network 107. The input unit 2113 is implemented by the keyboard 132 and mouse 133, and accepts an operation input from the user.

The display unit 2116 is implemented by the display 144, and displays the status of an operation input and image data in process. The storage unit 2111 is implemented by the storage device 139, and stores data to be processed and a database for storing records.

An outline of variable data printing will be explained with reference to FIG. 2.

FIG. 2 is a view for explaining an outline of variable data printing according to the embodiment of the present invention.

A plurality of containers 181 to 183 are laid out on a page in accordance with an operation instruction from the user via the user interface 103 of the layout editing application 121, and constraints on position and size are assigned to the containers to generate a document template 180.

The user interface 103 associates the document template 180 with a data source 190 (e.g., the database 119), and further associates each container with each data field in the data source 190. Association information 191, 192, and 193 representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information 191, 192, and 193 from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed content data.

For preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described. An example of a user interface realized by the user interface 103 will be explained with reference to FIG. 3.

[Main Window]

Figure 3:
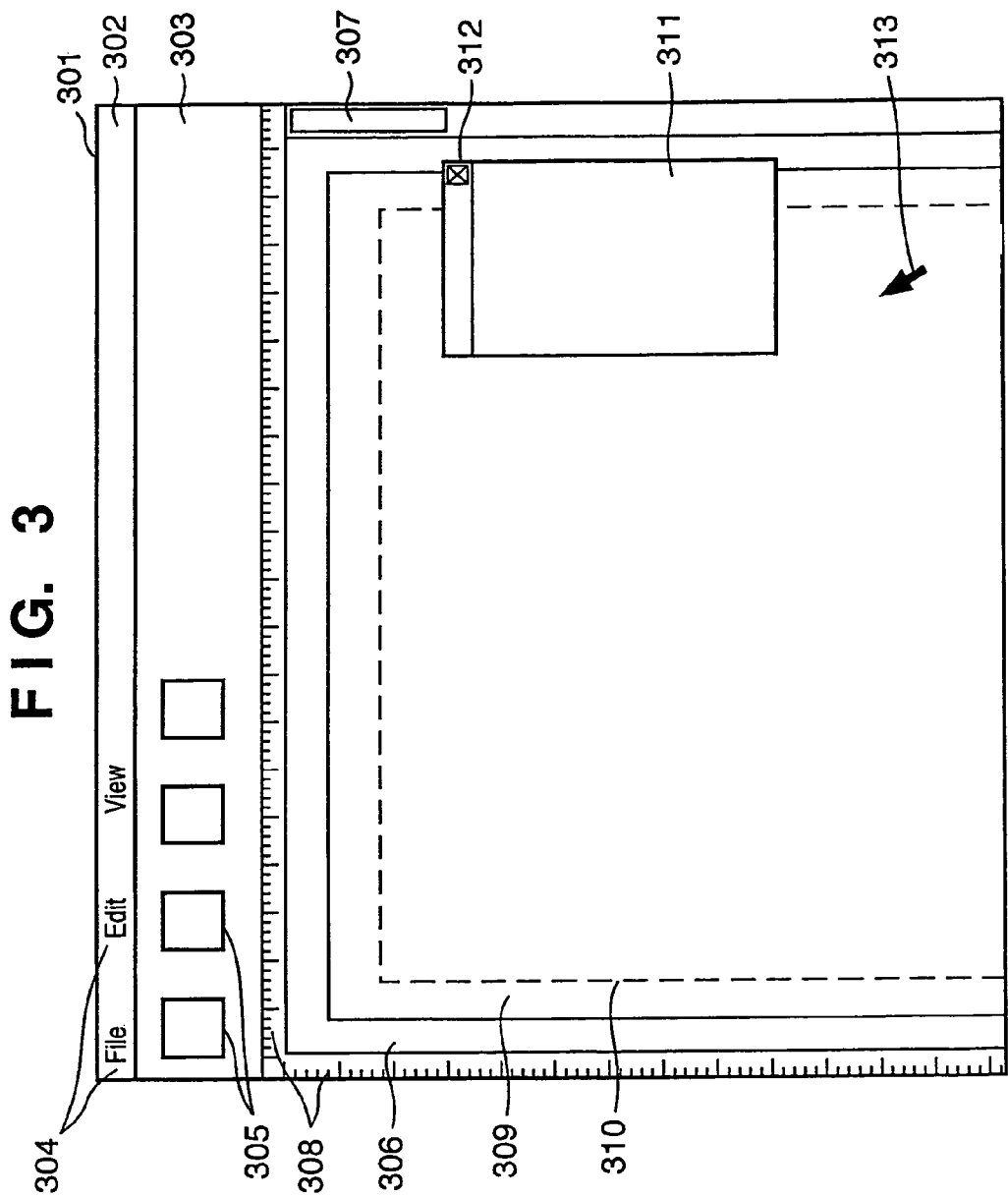
FIG. 3 is a view showing an example of a user interface according to the embodiment of the present invention.

FIG. 3 is a view showing an example of the user interface (display window) of the layout editing application according to the embodiment of the present invention.

As shown in FIG. 3, the user interface 103 displays on the display device 144 a user interface which is formed by an application window 301 upon operation. The window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

Figure 4:
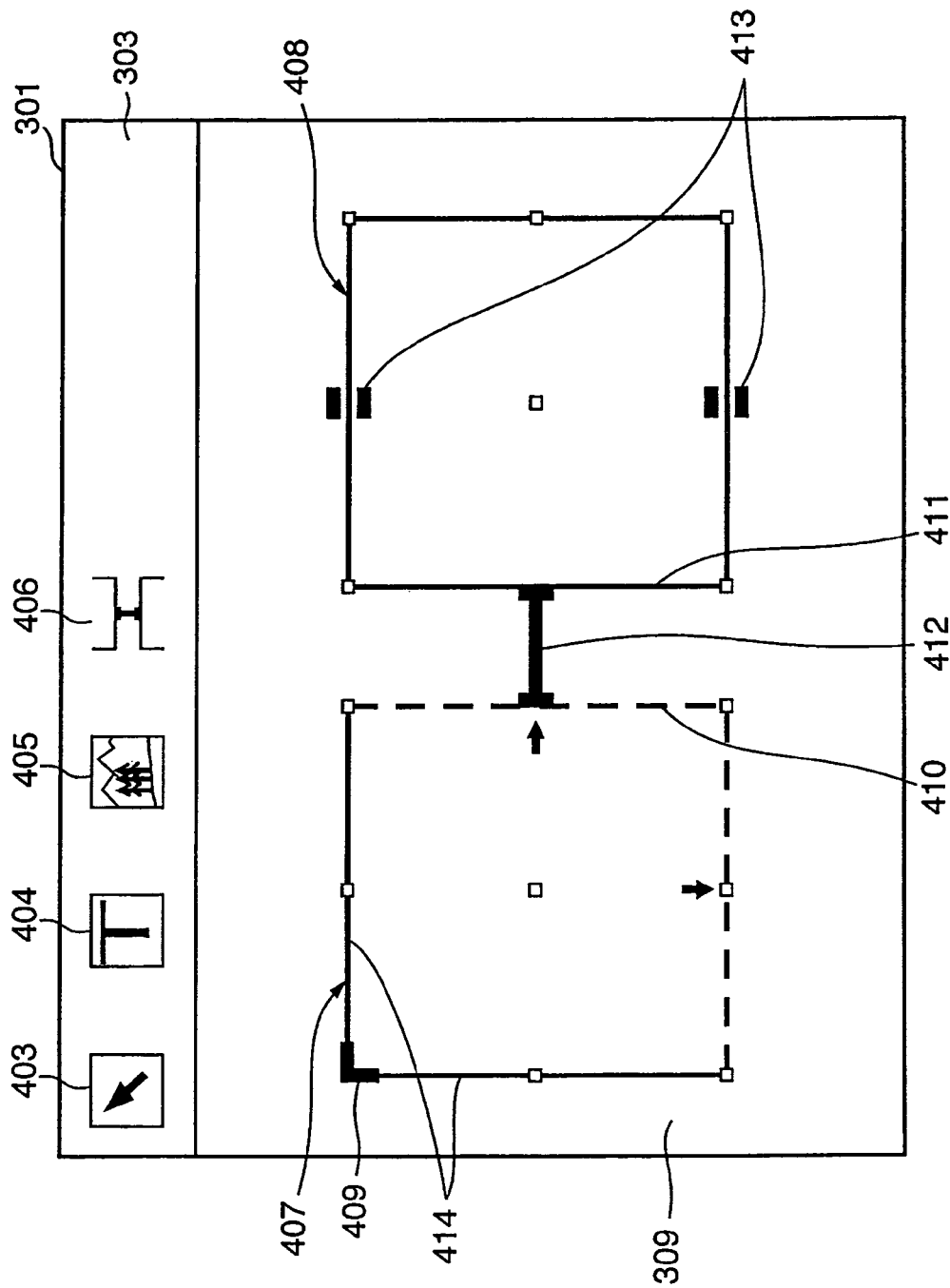
FIG. 4 is a view showing an example of display of a container in the user interface according to the embodiment of the present invention.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can determine a basic layout by laying out containers and links in a page. The basic layout is a base for variable data printing. When each container in the basic layout is a fixed layout, the print results of all records have the same layout.

When each container in the basic layout is a flexible container, the size and position of the container change in accordance with the amount and size of data loaded from each record under constraints. Hence, a document template created by the layout editing application 121 determines only the basic layout. When the document template contains a flexible container, the layout of a finally printed material is adjusted in accordance with flowed content data.

[Document Template]

In FIG. 3, the work area 306 is used to display and edit the design of the document template (180: basic layout). The work area 306 can present an outline of a document to be printed to the user while the user designs a document template.

A document template to be created has a layout intended by the user. A calculated layout changes between records because the system dynamically determines the layout in accordance with the amount and size of content data.

From a comparison between the document template and the preview after dynamic layout calculation, the user can easily understand how a document merged with the data source (190) changes depending on the amount and size of content data.

To print many records, each record and the document template must be compared with each other. The user cannot easily understand how much the layout of each record has changed by dynamic layout calculation, and preview display (to be described later) unique to the present invention must be presented.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on content data (variable data) in an associated data source. This is because an additional page is automatically created upon loading content data which cannot fit variable data in one page when a field that changes in size depending on the variable data amount, like a flexible table, is set in the document template.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container.

The link 412 represents that the containers 407 and 408 are associated. The link 412 also represents that the container 408 can be moved to the right while maintaining a length (range can be specified) set for the link 412. The slider 413 shows that it can be moved parallel to an edge at which the slider 413 is set.

[Container]

A container will be explained as a field area for inserting data of a plurality of types of data fields contained in each record in the database.

The container is a drawing area (to be referred to as a partial area) where a fixed or flexible text and image (data of a plurality of types of data fields) are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has container attributes representing the position, maximum, minimum, design sizes, the maximum and minimum font sizes of contents to be merged, and whether each edge is fixed/flexible. The definition of the container attribute in the embodiment will be described.

(1) A container has fixed or flexible contents. Content data (variable data) serving as flexible contents can be said to be dynamic in a sense that data acquired from the data source may change for each document, i.e., each record. Note that flexible contents in the embodiment are not intended to be animated contents or contents which change over time by another method because these contents are not suitable for printing.

Similarly, fixed contents are displayed at the same container size for all documents generated using containers. When, however, a link to flexible contents is set, fixed contents may change in position in each document under the influence of the flexible contents. Contents to be merged with containers change between records, and the display contents also change.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite count representing container operation when a container is merged with data from the data source, a line, an icon, and a text.

[Container Constraints]

The container has constraints on controlling how to link contents displayed in each document. These constraints (including linking of fixed/flexible contents to a container) are a major method of controlling generation of many documents from one document template by the user.

An example of the constraints is "the height of contents in this container is 4 inches at maximum". Another example of the constraints is "the left edge of contents in the container must be displayed at the same horizontal position in respective documents". The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in an area in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, a term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the horizontal position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When the corner position of a container, the intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial area). The user can create a desired basic layout when he determines the basic layout of the document template 180.

[Display and Editing of Container]

(1) Method of Creating New Container—

A container is described as either of two, text and image containers. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 2503 (item) or dotted line 2504 in order to represent the state of the container edge. The layout editing application 121 also uses anchors 2506, 2507, and 2509 (lines, shapes, or icons drawn near the edge of a container), a handle 2502 (control point drawn on or near the edge of an area for movement and modification), the slider 413 (short parallel lines drawn on the two sides of an edge: see FIG. 4), a scaling icon 2505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted to draw lines.

The place at which a flexible edge is drawn depends on the contents of a container. As will be described later, a "dynamic calibration process" is employed which means that contents are merged into a document template and visualized on a user interface. Alternate execution can be achieved by another means for determining where a flexible edge is laid out in a user interface or in the content area of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container are assistance to design a document template, and are not drawn on a printed material.

As described above, settings of a basic pattern such as the reference, minimum, and maximum values of the width and height of a container are displayed in a secondary dialog window.

In FIG. 5A, both the width and height of a container 2501 are not fixed (are flexible). A fixed edge 2503 is represented in a solid line, and a flexible edge 2504 is represented in a dotted line. A scaling icon 2505 exhibits that the adjacent edge 2504 is flexible. An indicator in another form may also be used instead or additionally.

In FIG. 5B, both the width and height of the container 2501 are flexible. An anchor icon 2506 is so added as to explicitly represent that the corner position between two crossing edges 2503 is fixed.

FIG. 5C shows a state in which both the width and height of the container 2501 are flexible, and the container 2501 can be equally enlarged in directions around the central point, as indicated by an arbitrary anchor icon 2507. That is, the container 2501 can be enlarged or reduced using the anchor icon 2507 as a center. In enlargement/reduction, the layout is adjusted so that the position of the anchor icon 2507 is always kept at the central point of the container 2501.

In FIG. 5D, an upper edge 2508 of the container 2501 is fixed, but both the width and height are flexible. The anchor icon 2509 positioned at the center of the upper edge 2508 is fixed. The left and right edges (2502) of the container 2501 pass the anchor icon 2509 and move apart from or close to the vertical center axis (vertical axis).

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
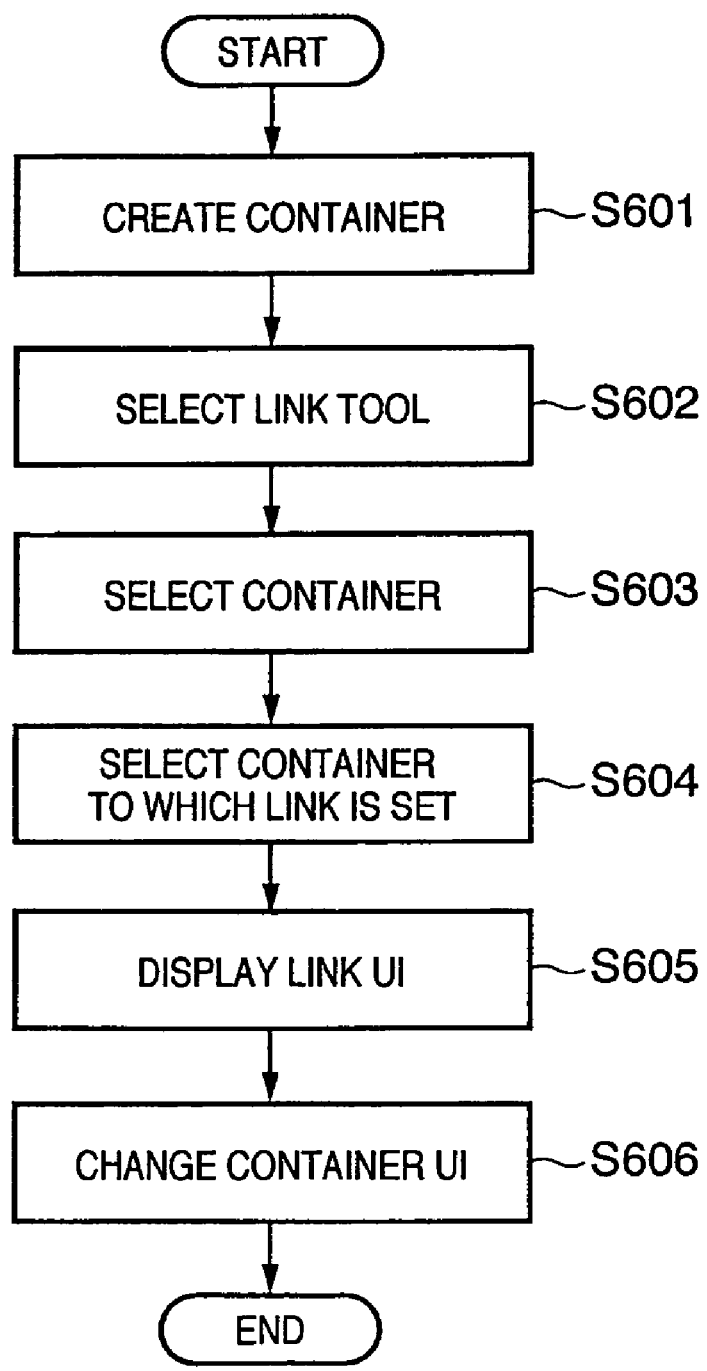
FIG. 6 is a flowchart showing a link setting process according to the embodiment of the present invention.
Figure 7A:
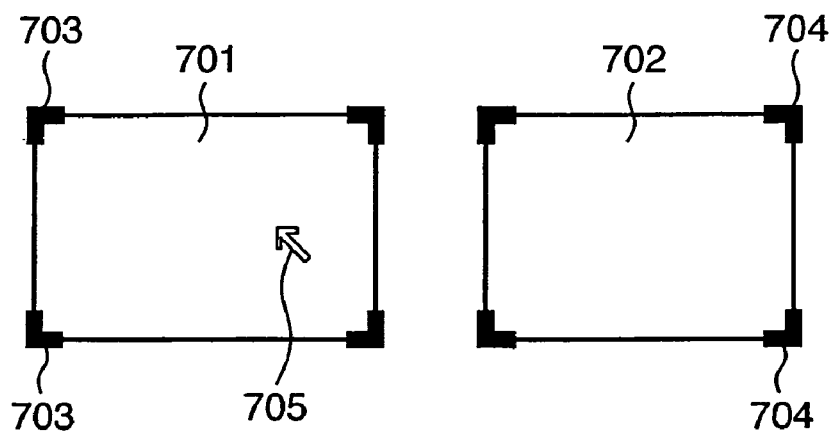
FIG. 7A is a view showing an example of transition of the user interface in setting a link according to the embodiment of the present invention.
Figure 7B:
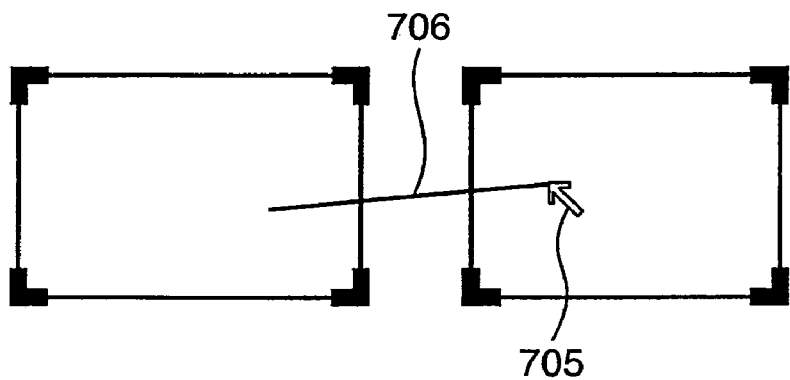
FIG. 7B is a view showing the example of transition of the user interface in setting a link according to the embodiment of the present invention.
Figure 7C:
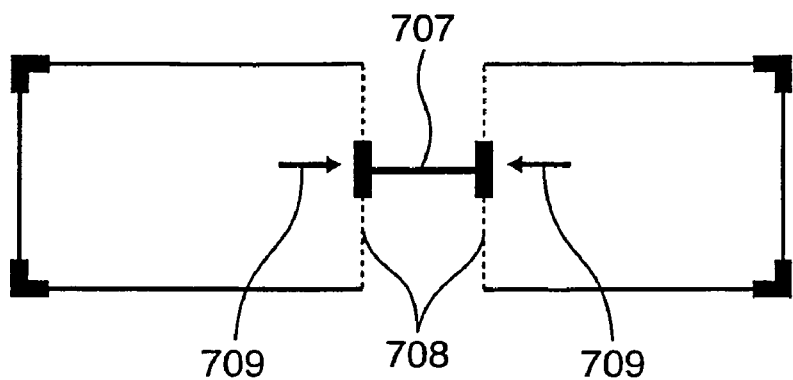
FIG. 7C is a view showing the example of transition of the user interface in setting a link according to the embodiment of the present invention.

FIG. 6 is a flowchart showing a link setting process according to the first embodiment of the present invention. FIGS. 7A to 7C are views showing an example of transition of a user interface in setting a link according to the first embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7B exhibits a line which connects a click position in the state of FIG. 7A and the current position of the mouse pointer 705. A UI indicated by the line segment 706 can present the user with a position at which a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 2505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>

[Layout Calculation Method (Overall Flow)]

The layout editing application 121 according to the first embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
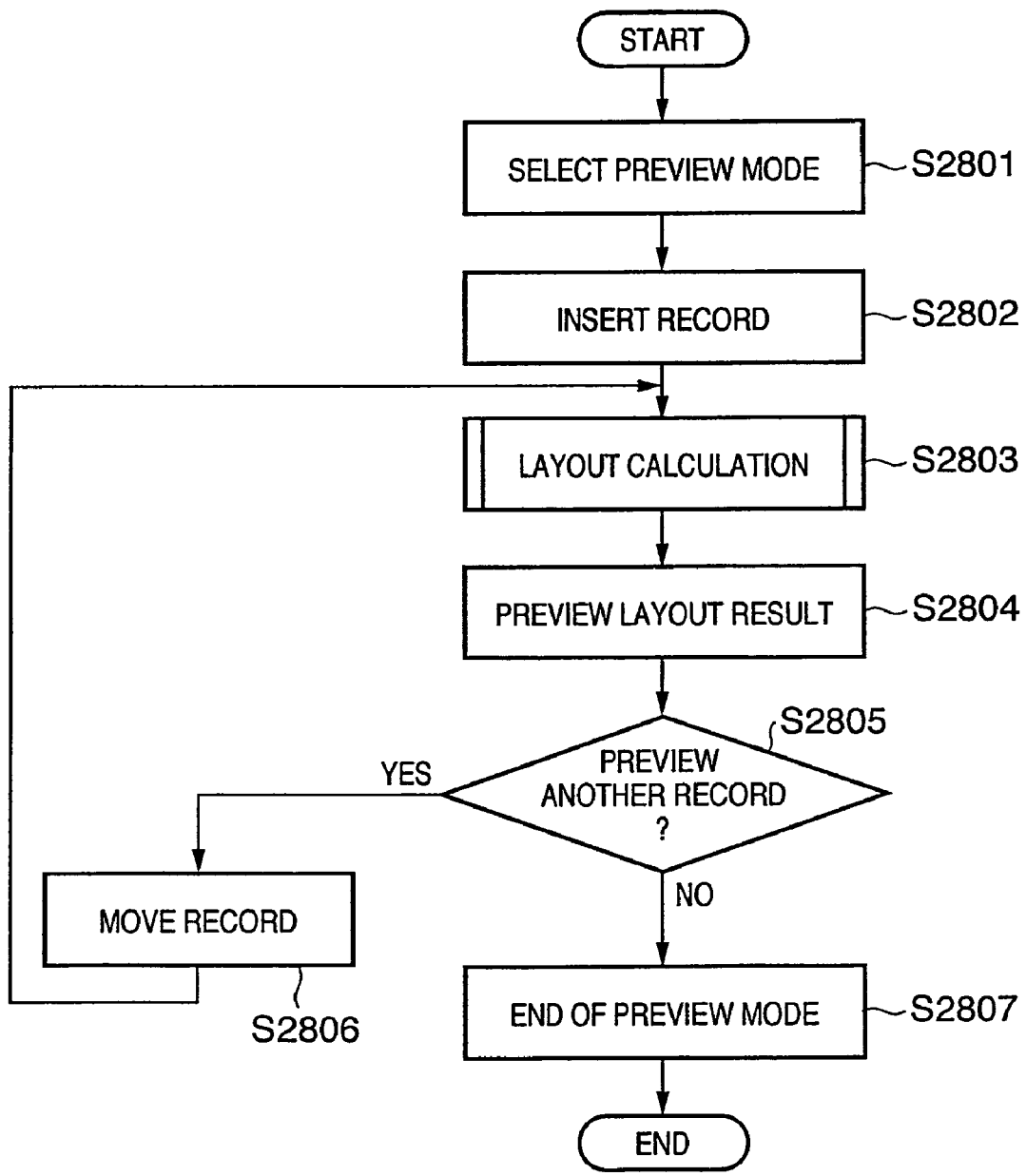
FIG. 8 is a flowchart showing a layout calculation process according to the embodiment of the present invention.

FIG. 8 is a flowchart showing the layout calculation process according to the first embodiment of the present invention.

The preview mode is selected (step S2801). In the preview mode, the layout editing application 121 prompts the user to select a record to be previewed from the data source, and inserts each field data of the selected record into each container (step S2802).

After the field data is inserted into each container, the layout editing application 121 executes layout calculation for laying but the record, and if necessary, adjusts the layout (step S2803). Details of layout calculation in step S2803 will be described later.

The layout editing application 121 displays (previews) the layout calculated in step S2803 (step S2804). The layout editing application 121 determines on the basis of an instruction from the user whether to preview another record (step S2805). If another record need not be previewed in step S2805 (NO in step S2805), the preview mode ends (step S2807).

If another record needs to be previewed (YES in step S2805), the layout editing application 121 selects another record, executes layout calculation again, and previews the calculated layout (step S2806).

In printing, unlike the preview mode, layout calculation is sequentially performed for all records to be printed. In printing, therefore, step S2804 is omitted, and whether all records to be printed have been processed is determined in step S2805. In step S2803, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S2803 will be explained with reference to FIG. 9.

Figure 9:
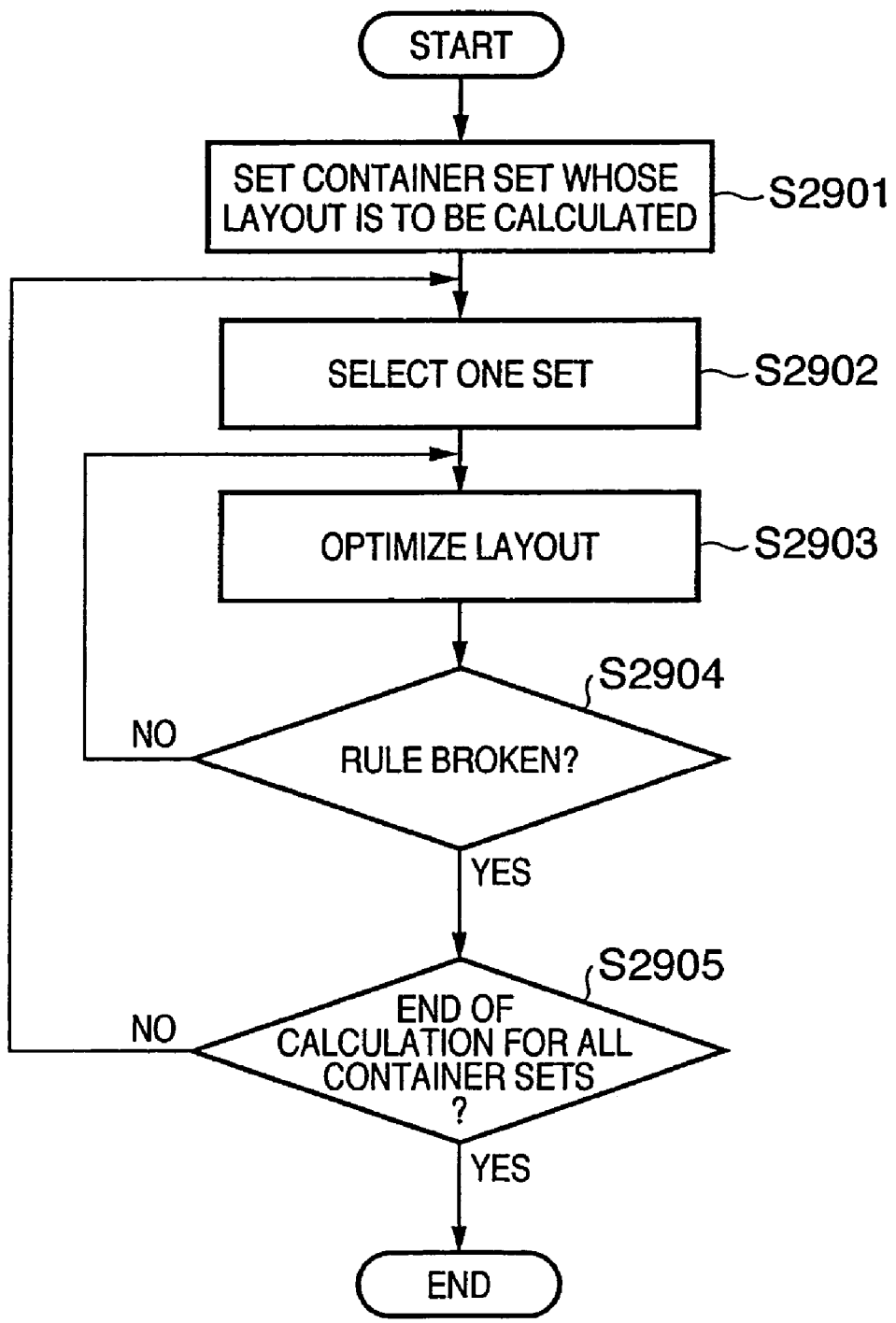
FIG. 9 is a flowchart showing details of the layout calculation process according to the embodiment of the present invention.

FIG. 9 is a flowchart showing details of the layout calculation process according to the first embodiment of the present invention.

FIG. 9 is a flowchart for explaining only the layout calculation process (dynamic layout calculation process), and this flow corresponds to a layout calculation process in printing/previewing of one record in variable data printing. For a plurality of records, the following process is repeated.

In the dynamic layout calculation process, the contents of each record are flowed (merged) from the database 119 into a document template, and the layout is dynamically calculated in accordance with the container attributes and the amount and size of each content. In the process in FIG. 9, the layout engine 105 of the layout editing application 121 operates using the processor 135 and memory 136.

The layout editing application 121 sets a set of containers whose layout is to be calculated (step S2901). Layout calculation is done for associated containers as one set.

Figure 10:
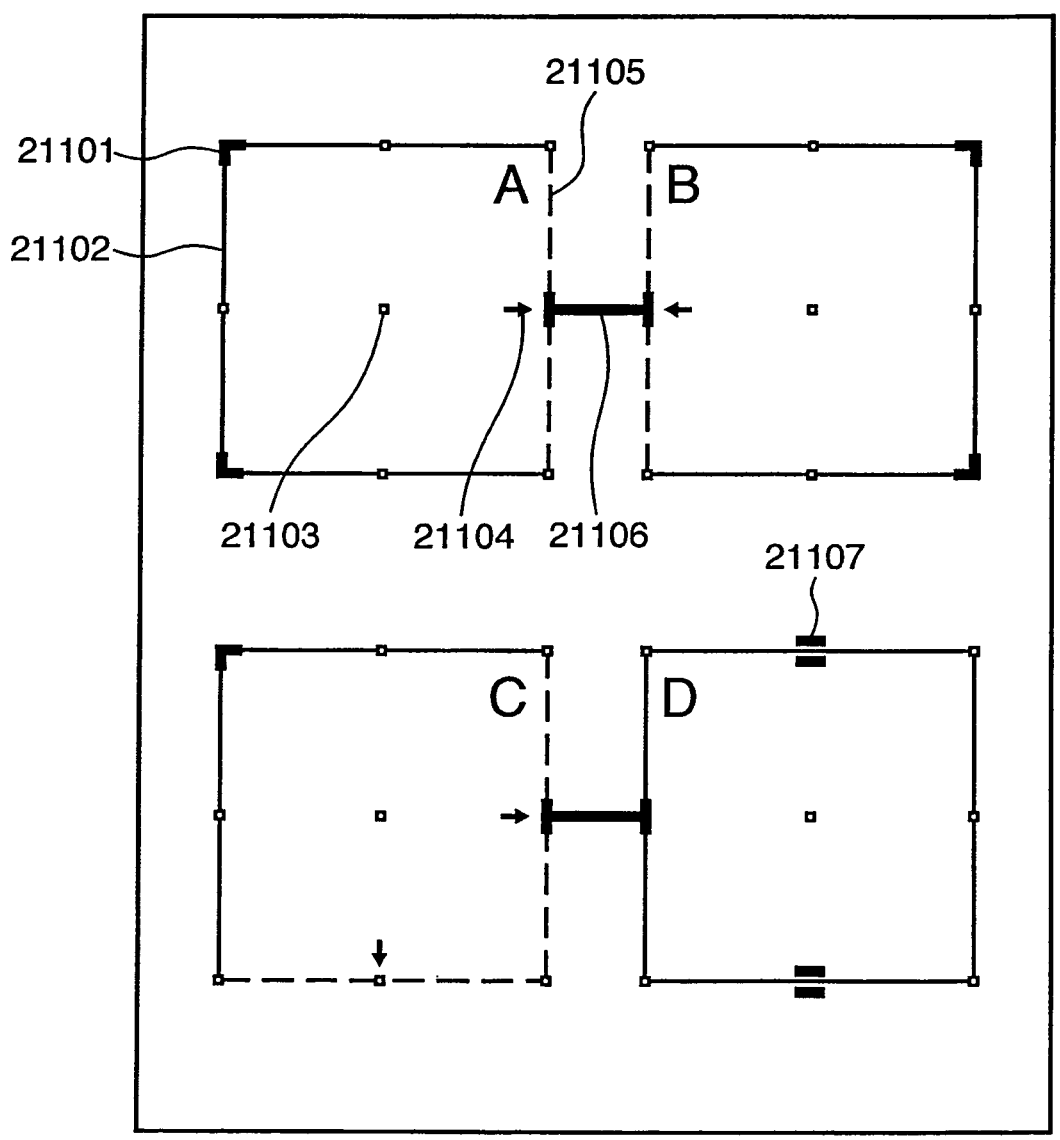
FIG. 10 is a view for explaining a set of containers in the layout calculation process according to the embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 21101 denotes an anchor; 21102, a fixed edge; 21103, a controller; 21104, an arrow indicating a direction in which a flexible edge changes; 21105, a flexible edge; 21106, a link; and 21107, a slider.

The layout editing application 121 selects one of the container sets obtained in step S2901 in order to calculate a layout (step S2902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S2903).

The layout is optimized so that the difference between the layout size and the size of contents to be inserted into a container is minimized in each of containers which are so associated as to dynamically change their sizes.

The layout editing application 121 calculates the size of the container set that is calculated in step S2902, i.e., the total size of containers A and B and link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout breaks the rules (step S2904). If the layout does not break rules (YES in step S2904), the process advances to step S2905. If the layout breaks the rules (NO in step S2904), the process returns to step S2903 to calculate the layout again so as not to break the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to break the rules, the layout of the set is completed.

In determining whether the rules are broken, the container position, size, and the like after layout calculation are compared with the position of a fixed edge, corner point, axis, or central point, the size of a fixed edge, and the like by referring to container information and link information of template data. As a result of the comparison, it is determined whether a container which should be fixed has moved or the container exceeds a constraint on movement.

If the layout is calculated without breaking the rules, i.e., the size and position of each container in a container set of interest are determined, the layout of the set is completed.

Note that optimization is executed only when contents do not fit in a container initially defined by the template. The optimization procedure need not be performed as far as corresponding contents fall within an associated container without changing the container size. In this case, the layout process is to fill contents in a corresponding container, and is not accompanied with a change of the container size.

The process from steps S2902 to S2904 is performed for all sets on the page, and the layout editing application 121 determines whether the layout of the entire page has been calculated (step S2905). If the calculation has not ended (NO in step S2905), the process returns to step S2902. If the calculation has ended (YES in step S2905), the process ends.

An example of a UI in the above-described layout calculation will be explained with reference to FIGS. 11A to 11C.

Figure 11A:
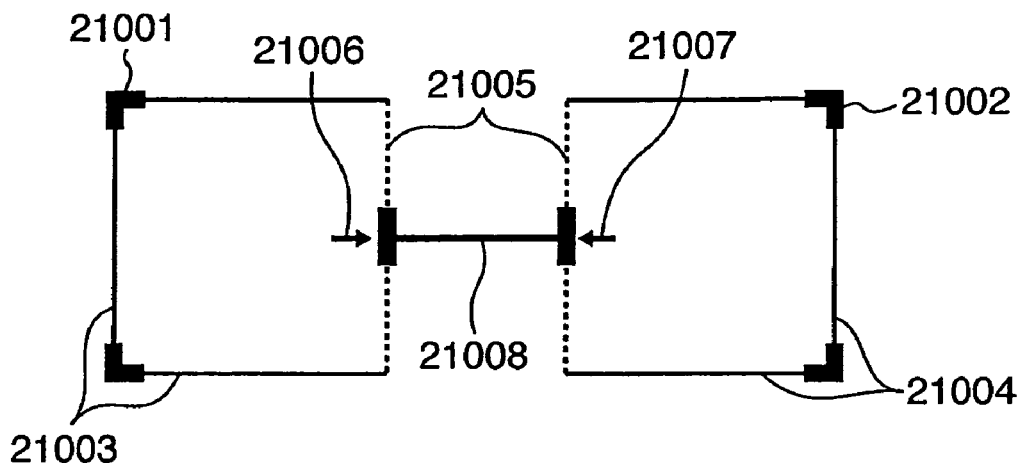
FIG. 11A is a view showing an example of the user interface in the layout calculation process according to the embodiment of the present invention.
Figure 11B:
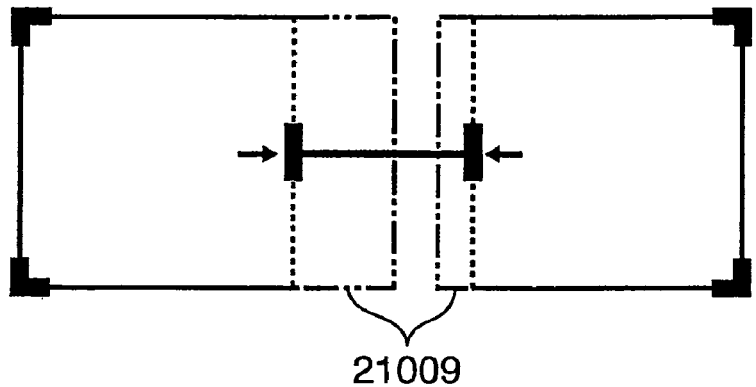
FIG. 11B is a view showing the example of the user interface in the layout calculation process according to the embodiment of the present invention.
Figure 11C:
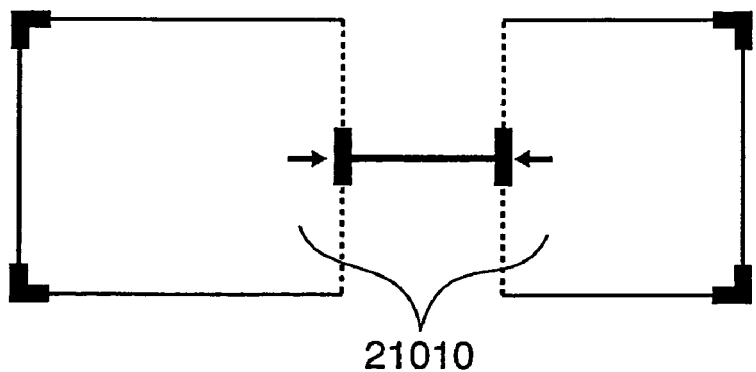
FIG. 11C is a view showing the example of the user interface in the layout calculation process according to the embodiment of the present invention.

FIGS. 11A to 11C are views showing an example of a user interface in the layout calculation process according to the first embodiment of the present invention.

FIG. 11A shows a state in which a given record is inserted and the layout is determined. Reference numerals 21001 and 21002 denote anchors; 21003 and 21004, fixed edges; 21005, a flexible edge; 21006, an arrow indicating a direction in which a flexible edge changes; and 21008, a link. In this state, a record is changed, and contents of different sizes are inserted.

FIG. 11B shows the size of new contents over the state of FIG. 11A. Reference numeral 21009 denotes a size of contents which are inserted into each container. After that, the layout is calculated.

FIG. 11C shows the result of layout calculation. The size of each container after calculation is so calculated as to have a difference equal to that of the size of contents to be actually inserted, and not to break the above-mentioned rules. As shown in FIG. 11C, the inserted-content size 21009 shown in FIG. 11B and a calculated content size 21010 have the same difference.

An outline of the variable printing system according to the embodiment will be described with reference to FIG. 12. The layout editing application 121 can set a print form for a document obtained by merging a document template with contents.

Figure 12:
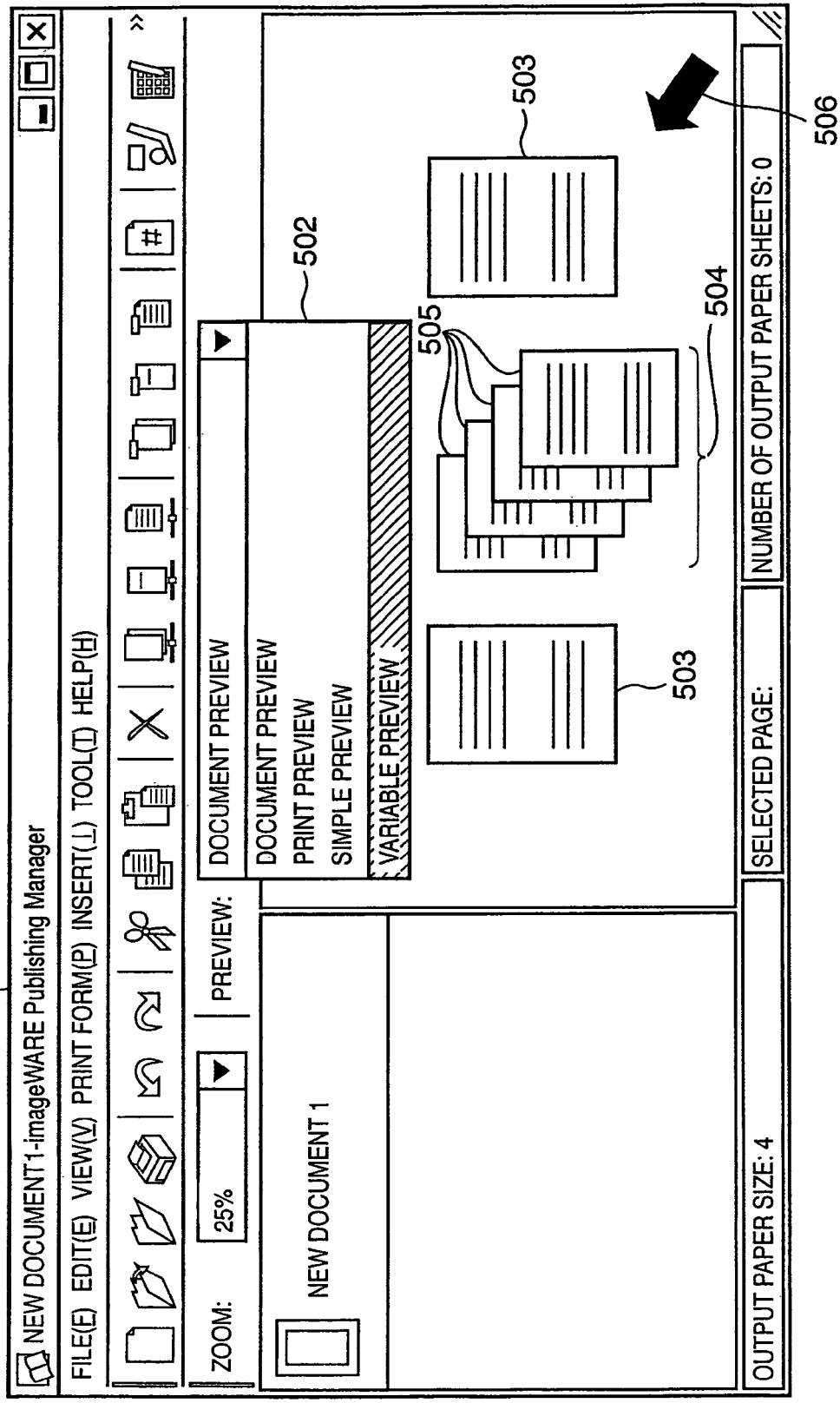
FIG. 12 is a view for explaining an outline of a variable printing system according to the embodiment of the present invention.

FIG. 12 is a view for explaining the outline of the variable printing system according to the embodiment of the present invention.

Reference numeral 501 denotes an application window of the layout editing application 121. Reference numeral 502 denotes a drop-down menu for switching (selecting) an arbitrary preview mode from a plurality of types of preview modes (document preview mode, print preview mode, simple preview mode, and variable preview mode). Reference numeral 503 denotes a normal document preview state. Reference numeral 504 denotes a variable data document preview state. Reference numeral 505 denotes each record of variable data. Reference numeral 506 denotes a mouse pointer.

In FIG. 12, the document template is formed from three pages. In this example, the first and third pages do not contain any variable area (container), and the second page contains a variable area (container). FIG. 12 illustrates a display window when the variable preview is selected.

The document preview displays the state of a document template formed from a plurality of pages. In the document preview, fixed contents (laid out in the document template in advance) are displayed on each page. However, a container area is blank because no content of each record is merged.

The print preview displays the state of a physical page by reflecting a print form set by the layout editing application 121. For example, when double-sided printing is set, upper and lower surfaces are displayed at display positions shifted in level. When Nup (a plurality of logical pages are laid out on one paper sheet) is set, N document pages (logical pages) are laid out on one paper sheet and displayed. Also in the print preview, a container area is blank because no content of each record is merged.

The simple preview presents simplified display contents. This preview omits any text, graphic, and image of contents to be actually printed, and displays only the page arrangement so that the user can recognize it.

The variable preview displays the state of each logical page when contents extracted from the database 119 are merged with a document template made up of a plurality of pages. A page (second page in the example of FIG. 12) subjected to variable printing is previewed for a plurality of records.

The present invention allows selecting a plurality of preview modes. When the variable preview mode is selected, records of variable data can be sorted (rearranged) in accordance with the change amount. Especially in the embodiment, the display order of records which form the variable data document 504 can be switched in accordance with the layout change amount.

A process executed by the variable printing system according to the embodiment will be described with reference to FIG. 13.

Figure 13:
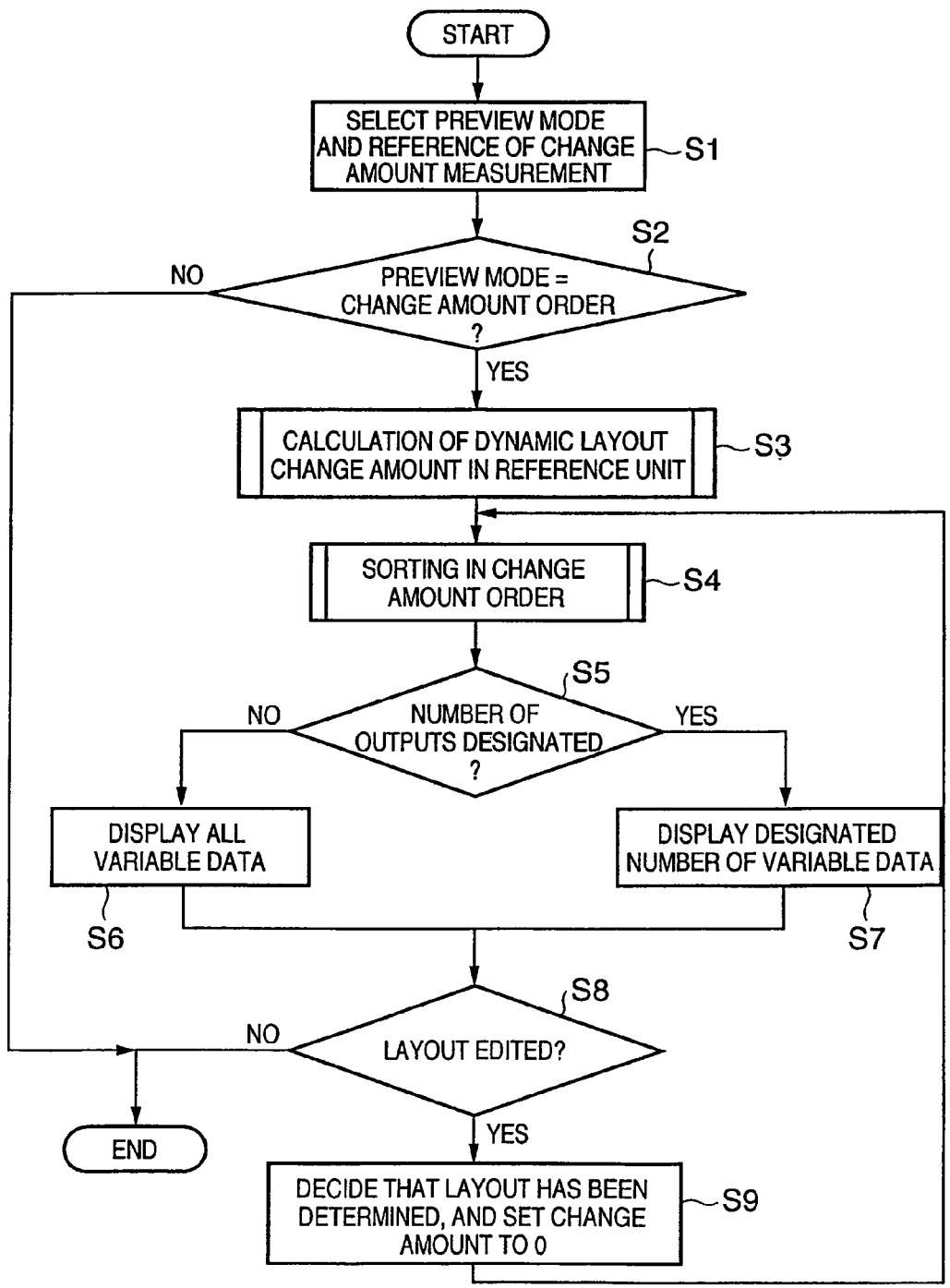
FIG. 13 is a flowchart showing a process executed by the variable printing system according to the embodiment of the present invention.

FIG. 13 is a flowchart showing the process executed by the variable printing system according to the embodiment of the present invention.

This process is implemented by the layout editing application 121.

When the process starts, a preview mode and the reference of the change amount are designated using a user interface (switching designation window (FIG. 17) to be described later) in step S1. The layout editing application 121 accepts variable data display order conditions (to be referred to as display conditions hereinafter).

In step S2, the layout editing application 121 determines whether the designated preview mode is based on the change amount order.

If the preview mode is not based on the change amount order (NO in step S2), content data of each record are imported from the database 119 in order to preview contents in the record order. The content data are merged into a document template, and a layout state after the dynamic layout calculation process shown in FIG. 9 is reduced (converted into a thumbnail). A variable preview is displayed, as shown in FIG. 12, and the process ends.

If the preview mode is based on the change amount order (YES in step S2), the process advances to step S3.

In step S3, the layout editing application 121 calculates a dynamic layout change amount on the basis of the designated reference (reference unit) of the change amount. The change amount calculation process will be described with reference to FIGS. 14 to 16. After the change amount is calculated, the layout editing application 121 sorts all variable data in accordance with the calculated change amount in step S4.

In step S5, the layout editing application 121 determines whether the number of outputs upon sorting based on the change amount order has been designated. The number of outputs can be designated by the user via a check box 1004 of the switching designation window in FIG. 17 (to be described later). If the display conditions include the output count designation (YES in step S5), the process advances to step S7 to display a variable preview by outputting records of variable data by the designated number of outputs to the display unit.

If the display conditions do not include any output count designation (NO in step S5), the process advances to step S6, and the layout editing application 121 displays, on the display unit, records of all variable data which have dynamically been laid out.

After the preview in step S6 or S7, the layout editing application 121 permits the user to edit the previewed variable page. At this timing, the user can finely adjust an excessive deviation of the layout for a record of a large change amount, and determine the layouts of all records without any change amount not intended by the user.

In step S8, the layout editing application 121 determines whether the user has edited the layout. If the layout has not been edited (NO in step S8), the process ends. If the layout has been edited (YES in step S8), the process advances to step S9. In step S9, the layout editing application 121 determines that the final confirmation and editing of the layout have ended. The layout editing application 121 sets 0 at the dynamic layout change amount of the variable data records, and saves the edited document contents. After that, the process returns to step S4 to sort variable data again.

According to the present invention, the dynamic layout change amount is calculated on the basis of a plurality of indices in step S3.

As examples of the indices, the present invention defines the change amount (defined as the degree of deviation) of the aspect ratio of a container before and after a dynamic layout change, the moving amount (defined as the degree of movement) of the container from an arbitrary start point before and after the dynamic layout change, and the change amount (defined as the degree of scaling) of the area of the container before and after the dynamic layout change. The present invention allows the user to select these indices and switch sorting of variable data at various indices.

Details of a process of calculating the degree of deviation will be explained with reference to FIG. 14 as an example of calculating the dynamic layout change amount in step S3.

Figure 14:
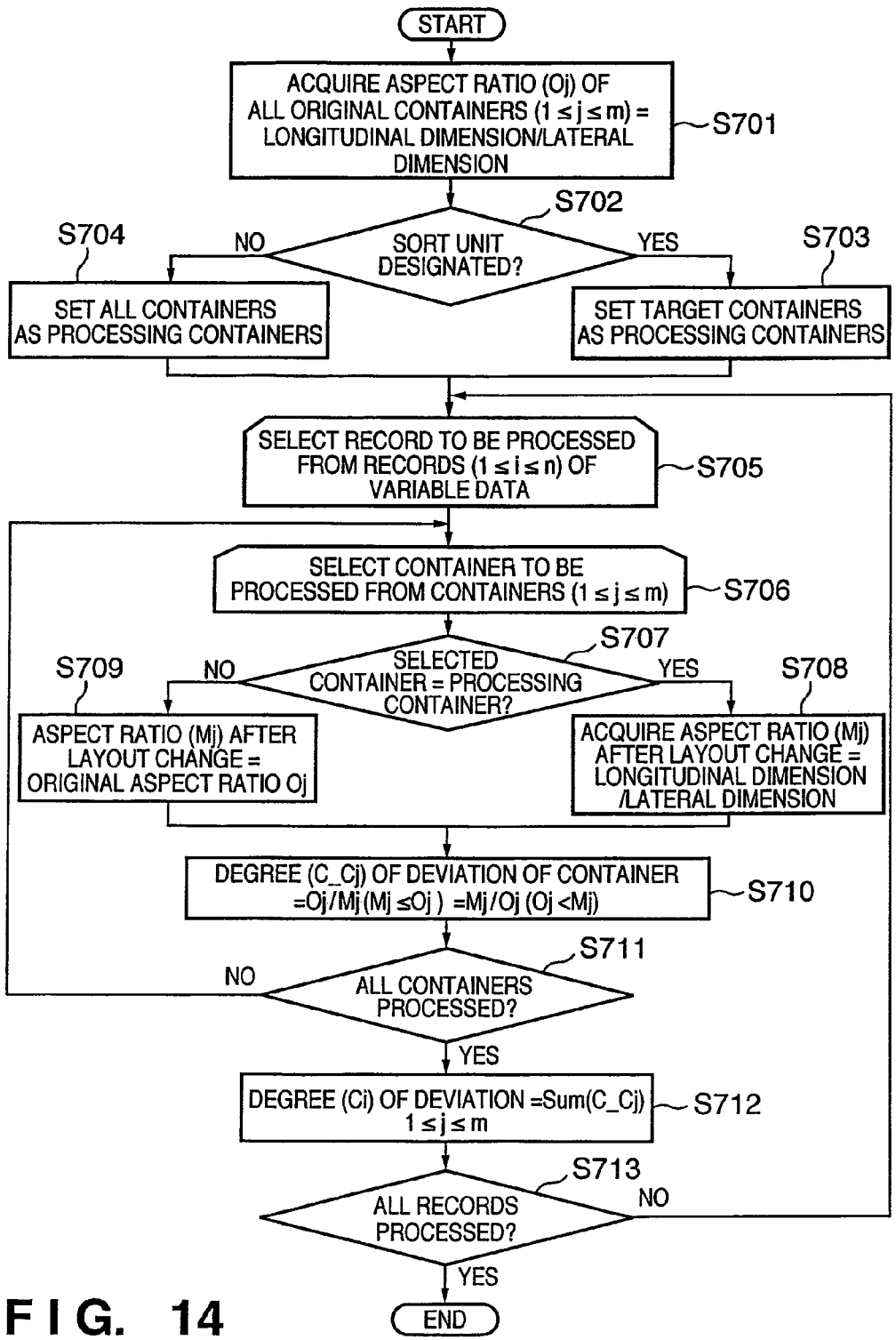
FIG. 14 is a flowchart showing details of a degree-of-deviation calculation process according to the embodiment of the present invention.

FIG. 14 is a flowchart showing details of the degree-of-deviation calculation process according to the embodiment of the present invention. This control is also implemented by some modules of the layout editing application 121.

After the start of the process of calculating the degree of deviation of the layout in the present invention, the layout editing application 121 acquires the aspect ratios (longitudinal dimensions/lateral dimensions) of all original containers (designed by the user) in a document template in step S701.

In FIG. 14, j ($1 \leq j \leq m$) represents each container in the document template, and Oj represents the aspect ratio.

In step S702, the layout editing application 121 determines, on the basis of display condition settings, whether the user has designated a sort unit. If it is determined on the basis of the check of the check box 1004 in FIG. 17 that the sort unit has been designated (YES in step S702), the process advances to step S703. In step S703, the layout editing application 121 sets all target containers as processing containers in the sort unit.

If the sort unit has not been designated (NO in step S702), the process advances to step S704, and the layout editing application 121 sets all containers as processing containers.

After the end of setting processing containers, a loop process from steps S705 to S713 is executed for the records and containers of all variable data.

In FIG. 14, i ($1 \leq i \leq n$) represents the records of all variable data.

In step S705, a record to be processed is selected. In step S706, a container to be processed is selected. In step S707, the layout editing application 121 determines whether the selected container is a processing container.

If the selected container is a processing container (YES in step S707), the process advances to step S708, and the layout editing application 121 calculates an aspect ratio Mj (longitudinal dimension/lateral dimension) of each dynamically laid-out container by the dynamic layout calculation process in FIG. 9. If the selected container is not a processing container (NO in step S707), the process advances to step S709, and the layout editing application 121 sets the aspect ratio Oj of the original container as Mj.

After the layout editing application 121 calculates the aspect ratio Mj after the dynamic layout, it calculates a degree C_Cj of deviation in the container unit in step S710.

The degree of deviation in the present invention is calculated by dividing a larger value out of the original aspect ratio Oj and the aspect ratio Mj after the dynamic layout by a smaller value. For $Mj \leq Oj$, $C\_Cj=Oj/Mj$, and for $Oj<Mj$, $C\_Cj=Mj/Oj$.

In step S711, the layout editing application 121 determines whether all containers have been processed. If all containers have not been processed (NO in step S711), the process returns to step S706 to select the next container to be processed. If all containers have been processed (YES in step S711), the process advances to step S712 to calculate the degree Ci of deviation of variable data in the sort unit. The degree of deviation in the sort unit is given by the sum of the degrees of deviation of target containers.

In step S713, the layout editing application 121 determines whether the records of all variable data have been processed. If the records of all variable data have not been processed (NO in step S713), the process returns to step S705 to select the next record to be processed. If the records of all variable data have been processed (YES in step S713), the process ends.

Details of a process of calculating the degree of movement will be explained with reference to FIG. 15 as another example of calculating the dynamic layout change amount in step S3.

Figure 15:
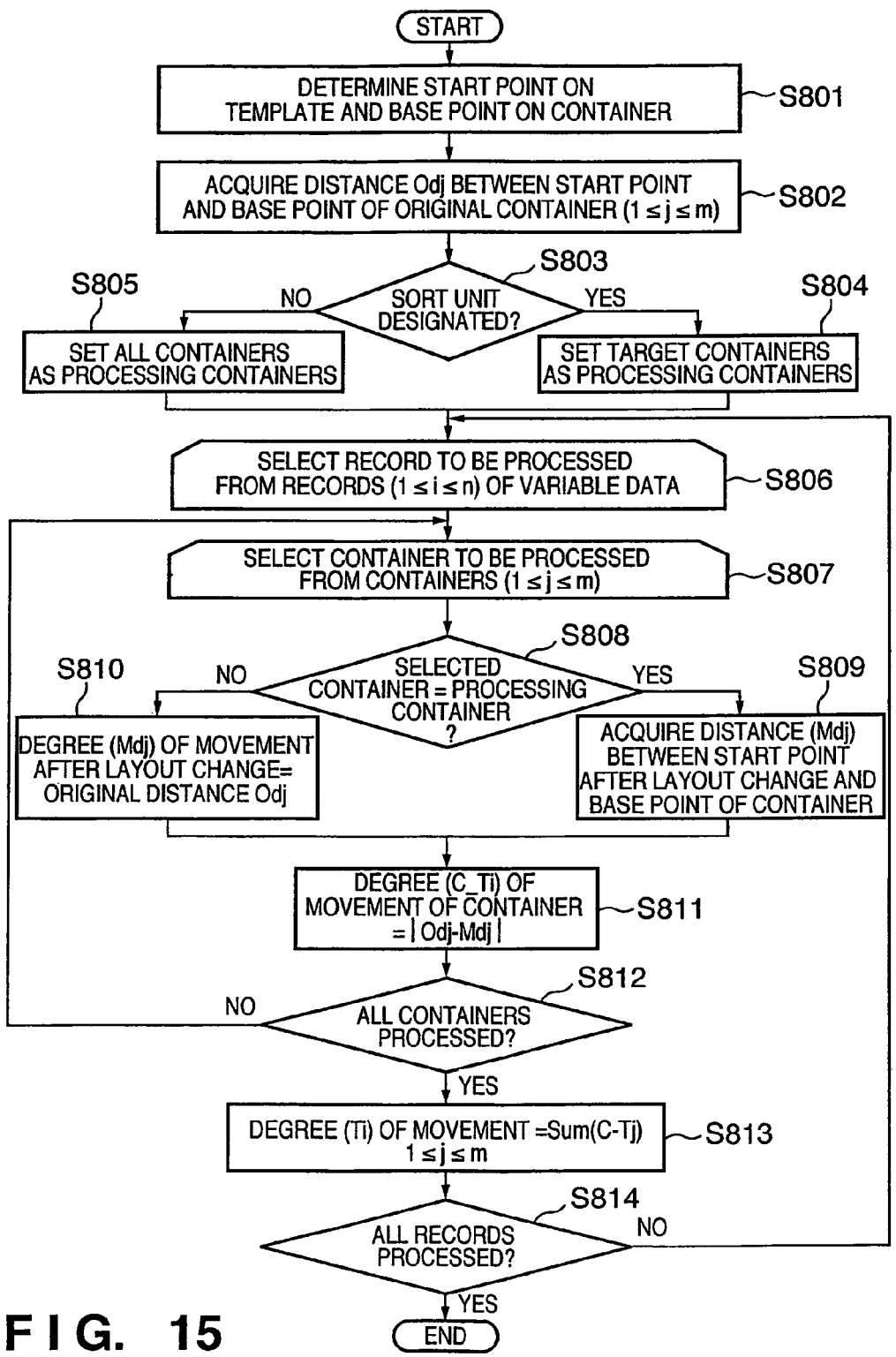
FIG. 15 is a flowchart showing details of a degree-of-movement calculation process according to the embodiment of the present invention.

FIG. 15 is a flowchart showing details of the degree-of-movement calculation process according to the embodiment of the present invention. This control is also implemented by some modules of the layout editing application 121.

After the start of the process of calculating the degree of movement of the layout in the present invention, a start point on a document template and the base point of each container are determined in step S801. In step S802, the layout editing application 121 acquires the distances between the start point and the base points of all original containers.

In FIG. 15, j ($1 \leq j \leq m$) represents each container in the document template, and Odj represents the distance.

Figure 17:
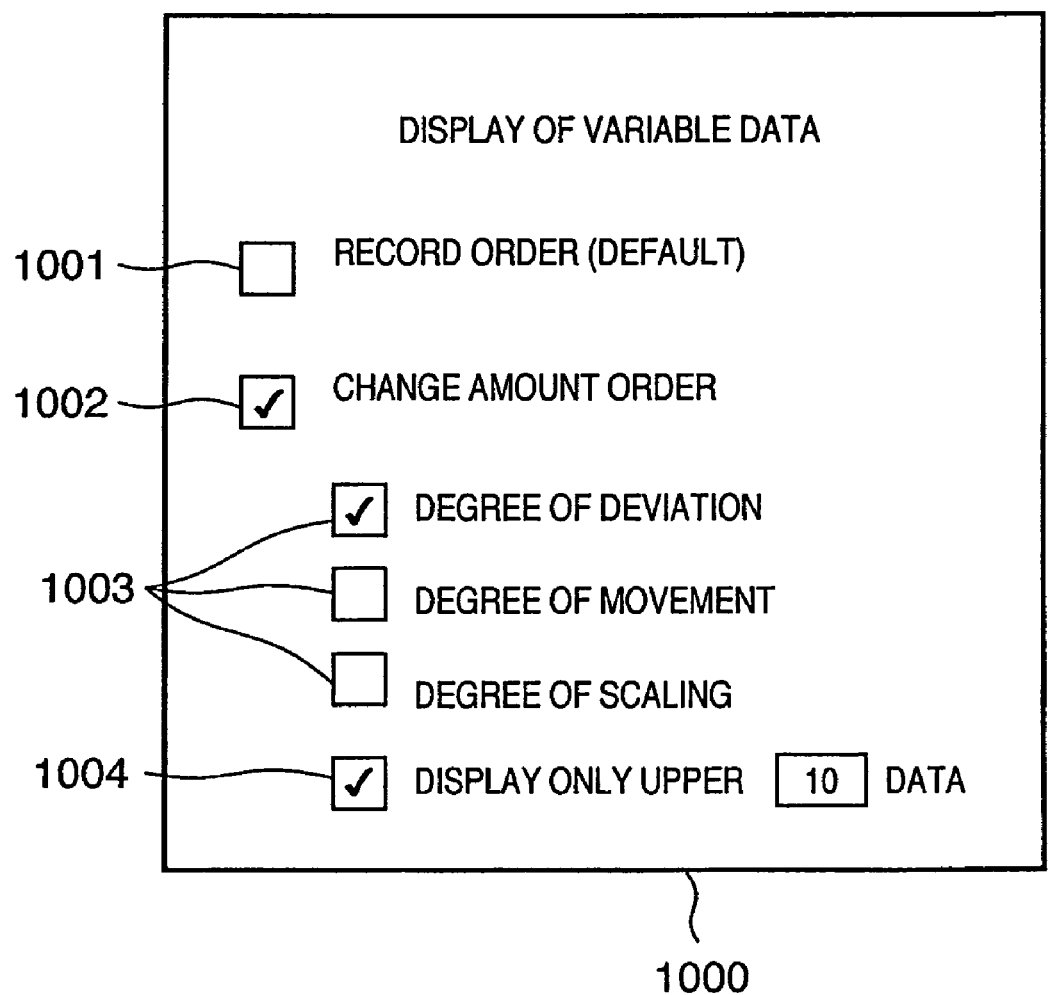
FIG. 17 is a view showing a switching designation window for designating switching of a variable data display method according to the embodiment of the present invention.

In step S803, the layout editing application 121 determines, on the basis of display condition settings and the check of the check box 1004 in FIG. 17, whether the user has designated a sort unit.

If the sort unit has been designated (YES in step S803), the process advances to step S804, and the layout editing application 121 sets all target containers as processing containers in the sort unit. If the sort unit has not been designated (NO in step S803), the process advances to step S805, and the layout editing application 121 sets all containers as processing containers.

After the end of setting processing containers, a loop process from steps S806 to S814 is executed for the records and containers of all variable data.

In FIG. 15, i ($1 \leq i \leq n$) represents the records of all variable data.

In step S806, a record to be processed is selected. In step S807, a container to be processed is selected. In step S808, the layout editing application 121 determines whether the selected container is a processing container.

If the selected container is a processing container (YES in step S808), the process advances to step S809, and the layout editing application 121 calculates a distance Mdj between the start point and the base point of each dynamically laid-out container by the dynamic layout calculation process in FIG. 9. If the selected container is not a processing container (NO in step S808), the process advances to step S810, and the layout editing application 121 sets the distance Odj between the original container and the start point as Mdj.

After the layout editing application 121 calculates the distance Mdj between the dynamically laid-out container and the start point, it calculates a degree C_Tj of movement in the container unit in step S811.

The degree of movement in the present invention is expressed by the absolute value of the difference between the distance Odj between an original container and a start point and the distance Mdj between a dynamically laid-out container and the start point.

In step S812, the layout editing application 121 determines whether all containers have been processed. If all containers have not been processed (NO in step S812), the process returns to step S807 to select the next container to be processed. If all containers have been processed (YES in step S812), the process advances to step S813 to calculate a degree Ti of movement of variable data in the sort unit. The degree of movement in the sort unit is given by the sum of the degrees of movement of target containers.

In step S814, the layout editing application 121 determines whether the records of all variable data have been processed. If the records of all variable data have not been processed (NO in step S814), the process returns to step S806 to select the next record to be processed. If the records of all variable data have been processed (YES in step S814), the process ends.

Details of a process of calculating the degree of scaling will be explained with reference to FIG. 16 as still another example of calculating the dynamic layout change amount in step S3. This control is also implemented by some modules of the layout editing application 121.

FIG. 16 is a flowchart showing details of the degree-of-scaling calculation process according to the embodiment of the present invention.

After the start of the process of calculating the degree of scaling of the layout in the present invention, the layout editing application 121 acquires the areas of all original containers in a document template in step S901.

In FIG. 16, j ($1 \leq j \leq m$) represents each container in the document template, and Maj represents the area.

In step S902, the layout editing application 121 determines, on the basis of display condition settings and the check of the check box 1004 in FIG. 17, whether the user has designated a sort unit.

If the sort unit has been designated (YES in step S902), the process advances to step S903, and the layout editing application 121 sets all target containers as processing containers in the sort unit. If the sort unit has not been designated (NO in step S902), the process advances to step S904, and the layout editing application 121 sets all containers as processing containers.

After the end of setting processing containers, a loop process from steps S905 to S913 is executed for the records and containers of all variable data.

In FIG. 16, i ($1 \leq i \leq n$) represents the records of all variable data.

In step S905, a record to be processed is selected. In step S906, a container to be processed is selected. In step S907, the layout editing application 121 determines whether the selected container is a processing container.

If the selected container is a processing container (YES in step S907), the process advances to step S908, and the layout editing application 121 calculates an area Mj of each dynamically laid-out container by the dynamic layout calculation process in FIG. 9. If the selected container is not a processing container (NO in step S907), the process advances to step S909, and the layout editing application 121 sets an area Oaj of the original container as Maj.

After the layout editing application 121 calculates the area Maj after the dynamic layout, it calculates a degree C_Aj of scaling in the container unit in step S910.

The degree of scaling in the present invention is calculated by dividing a larger value out of the original area Oaj and the area Maj after the dynamic layout by a smaller value. For Maj$\leq$Oaj, C_Aj= Oaj/Maj, and for Oaj<Maj, C_Aj=Ma/Oaj.

In step S911, the layout editing application 121 determines whether all containers have been processed. If all containers have not been processed (NO in step S911), the process returns to step S906 to select the next container to be processed. If all containers have been processed (YES in step S911), the process advances to step S912, and the layout editing application 121 calculates a degree Ai of scaling of variable data in the sort unit. The degree of scaling in the sort unit is given by the sum of the degrees of scaling of target containers.

In step S913, the layout editing application 121 determines whether the records of all variable data have been processed. If the records of all variable data have not been processed (NO in step S913), the process returns to step S905 to select the next record to be processed. If the records of all variable data have been processed (YES in step S913), the process ends.

A switching designation window for designating switching of the variable data display method will be explained with reference to FIG. 17.

FIG. 17 is a view showing the switching designation window for designating switching of the variable data display method according to the embodiment of the present invention.

In the preview of variable data (process in step S1 of FIG. 13), a check box 1001 (record order designation item) for displaying variable data in the record order is checked as a default in a switching designation window 1000. The display order of variable data can be switched by selecting a change amount calculation index in the switching designation window 1000.

To sort variable data in the change amount order, a change amount order check box 1002 (change amount order designation item) is checked. At the same time, a change amount calculation index is selected from a check box group 1003. When variable data are sorted in the change amount order, the number of variable data to be displayed in the descending order of the change amount can also be designated in a check box 1004 (sort unit item).

In the present invention, variable data can be sorted in accordance with a reference change amount designated by the user, and a change amount calculation area, i.e., sort unit can also be designated. As an example of the change amount calculation area, a container unit serving as a minimum unit, an arbitrary page unit when variable data spread across a plurality of pages, or a record unit can be defined. The user can designate a change amount calculation area with an input device such as the mouse 133.

An example of selecting a change amount calculation area will be explained with reference to FIGS. 18A to 18C.

Figure 18A:
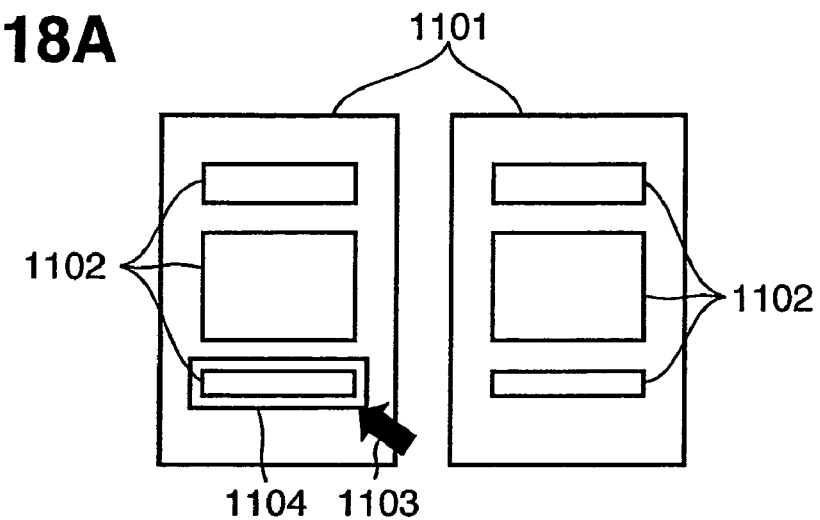
FIG. 18A is a view showing an example of selecting the unit (container unit) of change amount calculation according to the embodiment of the present invention.
Figure 18B:
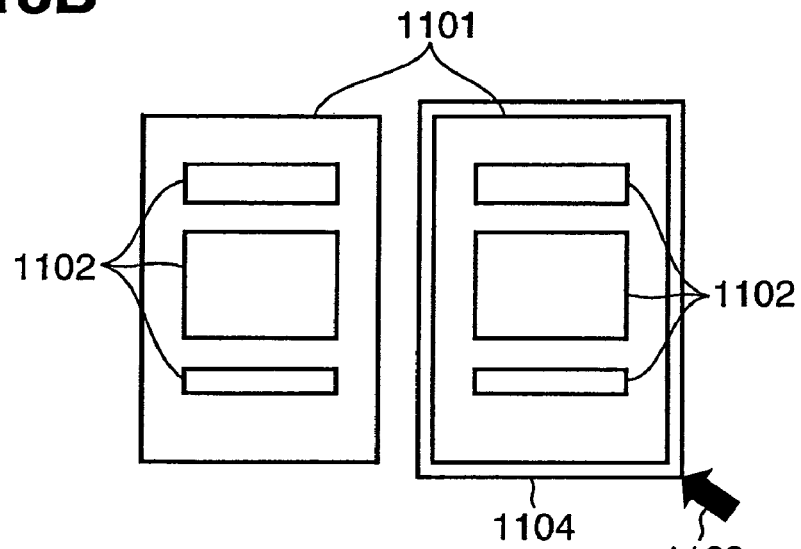
FIG. 18B is a view showing another example of selecting the unit (page unit) of change amount calculation according to the embodiment of the present invention.
Figure 18C:
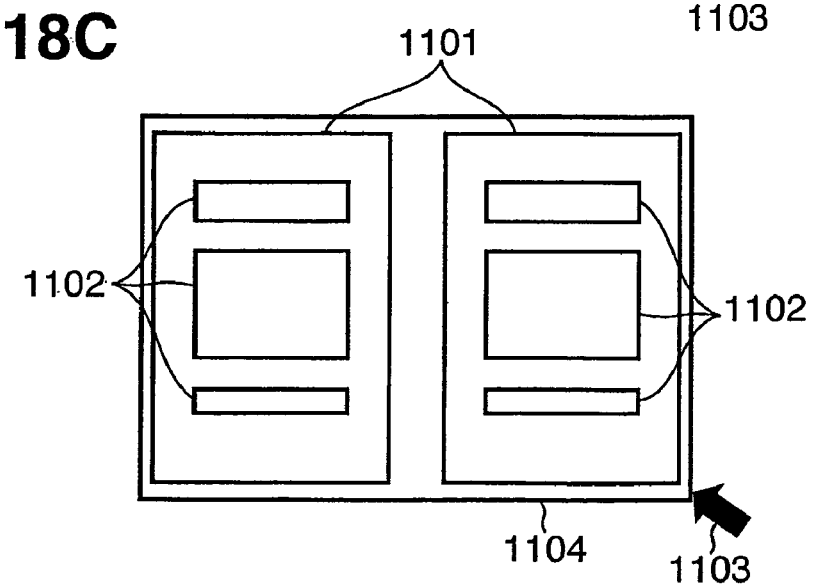
FIG. 18C is a view showing still another example of selecting the unit (record unit) of change amount calculation according to the embodiment of the present invention.

FIGS. 18A to 18C are views showing an example of selecting a change amount calculation area according to the present invention.

FIGS. 18A to 18C illustrate one record 1101 of variable data. Reference numeral 1102 denotes each container; and 1103, a mouse pointer. Reference numeral 1104 denotes a state in which a change amount calculation area is selected with the mouse pointer 1103.

FIG. 18A shows a case in which an arbitrary container in variable data is selected. FIG. 18B shows a case in which an arbitrary page in variable data is selected. FIG. 18C shows a case in which all variable data (entire record) are selected.

When an arbitrary page in variable data of one record which spreads across a plurality of pages is designated, as shown in FIG. 18B, the designated page may not exist for a given record of variable data. In this case, according to the present invention, the change amount of variable data is regarded as 0, and the variable data are sorted.

A confirmation window for confirming whether to designate re-sorting after the process of step S709 in FIG. 14, i.e., after editing the layout will be explained with reference to FIG. 19.

Figure 19:
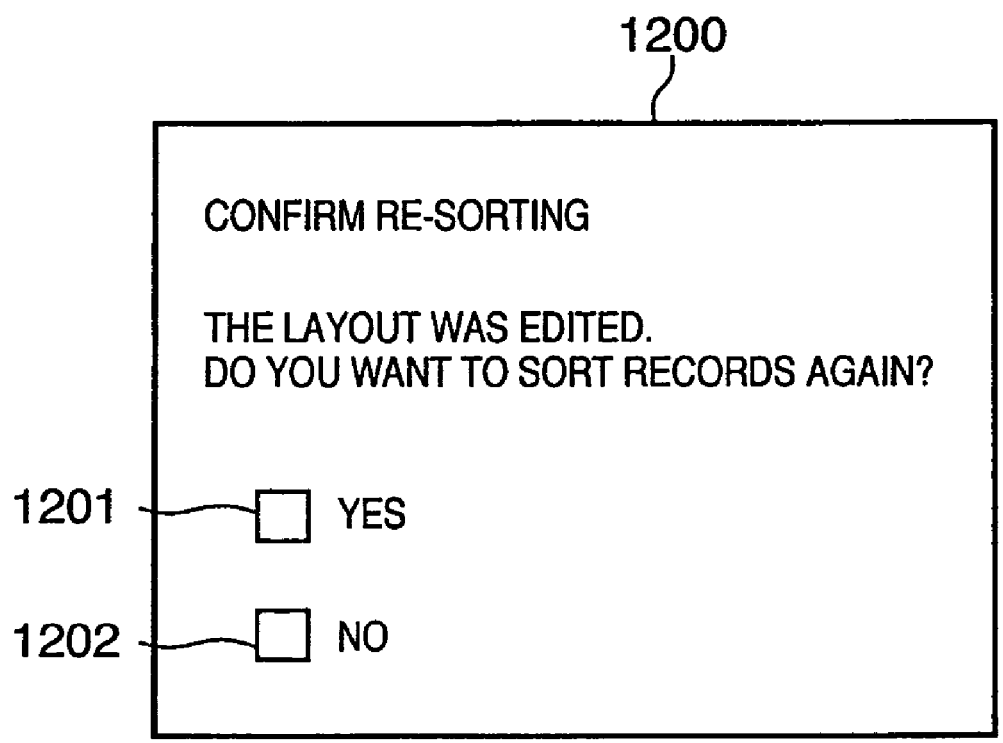
FIG. 19 is a view showing a confirmation window for confirming whether to designate re-sorting after editing the layout according to the embodiment of the present invention.

FIG. 19 is a view showing the confirmation window for confirming whether to designate re-sorting after editing the layout according to the embodiment of the present invention.

If the layout is edited after the records of variable data are sorted in the change amount order, a confirmation window 1200 in FIG. 19 is displayed, and the user can designate whether to lay out the variable data again after the layout is edited.

To lay out the variable data again, the user checks a "YES" check box 1201. If the user does not lay out the variable data again, he checks a "NO" check box 1202.

A default variable data preview will be explained with reference to FIG. 20.

FIG. 20 is a view showing the state of the default variable data preview according to the embodiment of the present invention.

Reference numeral 1301 denotes an application window; 1302, a normal document preview state; and 1303, a variable data document preview state. Reference numerals 1304, 1305, 1306, and 1307 denote records A, B, C, and D of variable data. Each of the records 1304 to 1306 is formed from two pages, and the record 1307 is formed from one page.

In FIG. 20, reference data (record data) of variable data are stored in the order of the records 1304, 1305, 1306, and 1307. In the default preview of the present invention, the records of variable data are displayed in a predetermined order of the reference data (e.g., an order in which the reference data are stored in the database). Reference numeral 1308 denotes a mouse pointer.

A variable data preview based on a designated change amount will be explained with reference to FIGS. 21A to 21C.

FIGS. 21A to 21C are views each showing the state of a variable data preview on the basis of, as a reference, an arbitrary change amount according to the embodiment of the present invention.

FIGS. 21A to 21C illustrate previews when the sort unit is the container unit (FIG. 21A), the page unit (FIG. 21B), and the record unit (FIG. 21C), unlike the variable data preview shown in FIG. 20.

In FIGS. 21A to 21C, reference numeral 1401 denotes an application window; 1402, a normal document preview state; 1404, a variable data document preview state; 1405 to 1408, records of variable data in FIG. 20; and 1409, a mouse pointer.

FIG. 21A shows that a sort unit 1403a is the container unit. The records 1405, 1406, 1407, and 1408 correspond to records D, C, B, and A of variable data in FIG. 20. The example of FIG. 21A represents that the value of the change amount is larger in the order of records D, C, B, and A when the change amount is calculated for each container of the variable data 1303 in FIG. 20 as the sort unit.

FIG. 21B shows that the sort unit is a page, and a sort unit 1403b is the page unit. The records 1405, 1406, 1407, and 1408 correspond to records C, B, A, and D of variable data in FIG. 20. The example of FIG. 21B represents that the value of the change amount is larger in the order of records C, B, A, and D when the change amount is calculated for each page of the variable data 1303 in FIG. 20 as the sort unit.

In the present invention, when the sort unit is a page and no designated page (corresponding to record D in FIG. 20) exists, the change amount is regarded as 0, and the variable data are sorted.

FIG. 21C shows that a sort unit 1403c is the record unit. The records 1405, 1406, 1407, and 1408 correspond to records B, C, D, and A of variable data in FIG. 20. The example of FIG. 21C represents that the value of the change amount is larger in the order of records B, C, D, and A when the change amount is calculated for each record of the variable data 1303 in FIG. 20 as the sort unit.

As described above, according to the embodiment, a variable data document whose layout has dynamically been changed is displayed on the front in the preview on the basis of a designated change amount. The user can easily find out a page whose layout has been changed, increasing the work efficiency of the user in final layout confirmation.

Note that the embodiment has exemplified three types of change amounts: the degree of deviation, the degree of movement, and the degree of scaling. However, the present invention is not limited to this, and another index (e.g., the editing amount of data (text or image) in a container) can also be set as a change amount.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-20020, filed Jan. 27, 2005, which is hereby incorporated by reference herein in its entirety.

What is claimed is:

1. An information processing apparatus which performs layout processing on the basis of a record including a plurality of contents data and a template including field areas for inserting the contents data, comprising:

a layout determination unit for calculating sizes of the field areas in the template of each record of a plurality of records on the basis of amounts or sizes of contents data of each record, and determining a layout of each record;

a calculation unit for calculating a change amount of the field areas of the each record by comparing the size of the field area of each record after the layout is determined by said layout determination unit with the size of the field areas of the template before the layout is determined by said layout determination unit;

a designation unit for designating a change amount order as a displaying order of the records, and a display control unit for displaying layouts of the plurality of records in the order based on the change amount calculated by said calculation unit when the change amount order is designated by said designation unit, and displaying layouts of the plurality of records in an order based on the record number when the change amount order is not designated by said designation unit.

2. The apparatus according to claim 1, wherein said layout determination unit calculates ideal values of the sizes of the field areas serving as merge destinations from the amounts or the sizes of the contents data, and when the field areas in the template cannot be laid out to satisfy the ideal values of the field areas, determines sizes and positions of the field areas so as to make equal loads based on differences from the ideal values.

3. The apparatus according to claim 1, wherein when a document is edited after the document is displayed by said display control unit, said display control unit changes again, on the basis of an editing content, the order of the records which form the document, and displays the records.

4. A method of controlling an information processing apparatus which performs layout processing on the basis of a record including a plurality of contents data and a template, including field areas for inserting the contents data, comprising:

a layout determination step of calculating sizes of the field areas in the template of each record of a plurality of records on the basis of amounts or sizes of the contents data of each record, and determining a layout of each record;

a calculation step of calculating a change amount of the field areas of each record by comparing the size of the field areas of each record after the layout is determined in the layout determination step with the size of the field areas of the template before the layout is determined in said layout determination step;

a designation step for designating a change amount order as a displaying order of the records, and a display control step of displaying layouts of the plurality of records in the order based on the change amount calculated in said calculation step when the change amount order is designated in said designation step, and displaying layouts of the plurality of records in an order based on the record number when the change amount order is not designated in said designation step.

5. The method according to claim 4, wherein in the layout determination step, ideal values of the sizes of the field areas serving as merge destinations are calculated from the amounts or the sizes of the contents data, and when the field areas in the template cannot be laid out to satisfy the ideal values of the field areas, sizes and positions of the field areas are so determined as to make equal loads based on differences from the ideal values.

6. The method according to claim 4, wherein in the display control step, when a document is edited after the document is displayed in the display control step, the order of the records which form the document is changed again on the basis of an editing content, and the records are displayed.

7. A program stored in a computer program product for causing a computer to control an information processing apparatus which performs layout processing on the basis of a record including a plurality of contents data and a template including field areas for inserting the contents data, characterized by causing the computer to execute:

a layout determination step of calculating sizes of the field areas in the template of each record of a plurality of records on the basis of amounts or sizes of the contents data of each record, and determining a layout of each record;

a calculation step of calculating a change amount of the field areas of each record by comparing the size of the field areas of each record after the layout is determined in the layout determination step with the size of the field areas of the template before the layout is determined in said layout determination step;

a designation step for designating a change amount order as a displaying order of the records, and a display control step of displaying layouts of the plurality of records in the order based on the change amount calculated in said calculation step when the change amount order is designated in said designation step, and displaying layouts of the plurality of records in an order based on the record number when the change amount order is not designated in said designation step.

8. The program according to claim 7, wherein in the layout determination step, ideal values of the sizes of the field areas serving as merge destinations are calculated from the amounts or the sizes of the contents data, and when the field areas in the template cannot be laid out to satisfy the ideal values of the field areas, sizes and positions of the field areas are so determined as to make equal loads based on differences from the ideal values.

9. The program according to claim 7, wherein in the display control step, when a document is edited after the document is displayed in the display control step, the order of the records which form the document is changed again on the basis of an editing content, and the records are displayed.

* * * * *